US012207136B2

(12) United States Patent
Johansson et al.

(10) Patent No.: US 12,207,136 B2
(45) Date of Patent: Jan. 21, 2025

(54) TECHNIQUE FOR REPORTING QUALITY OF EXPERIENCE (QoE)—AND APPLICATION LAYER (AL) MEASUREMENTS AT HIGH LOAD

(71) Applicant: Telefonaktiebolaget LM Ericsson (publ), Stockholm (SE)

(72) Inventors: Nicklas Johansson, Linköping (SE); Robert Petersen, Linköping (SE); Waikwok Kwong, Solna (SE); Cecilia Eklöf, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 410 days.

(21) Appl. No.: 17/632,549

(22) PCT Filed: Aug. 10, 2020

(86) PCT No.: PCT/EP2020/072418
§ 371 (c)(1),
(2) Date: Feb. 3, 2022

(87) PCT Pub. No.: WO2021/028397
PCT Pub. Date: Feb. 18, 2021

(65) Prior Publication Data
US 2022/0279385 A1      Sep. 1, 2022

Related U.S. Application Data

(60) Provisional application No. 62/886,781, filed on Aug. 14, 2019, provisional application No. 62/885,174, filed on Aug. 9, 2019.

(51) Int. Cl.
*H04W 28/08*       (2023.01)
*H04W 24/10*       (2009.01)
*H04W 28/02*       (2009.01)

(52) U.S. Cl.
CPC ....... *H04W 28/0992* (2020.05); *H04W 24/10* (2013.01); *H04W 28/0284* (2013.01); *H04W 28/0942* (2020.05)

(58) Field of Classification Search
CPC ......... H04W 28/0992; H04W 28/0942; H04W 28/0284; H04W 24/10
See application file for complete search history.

(56) References Cited

U.S. PATENT DOCUMENTS 9,544,796 B2    1/2017  Futaki et al.
2013/0114446 A1*   5/2013  Liu .................. H04W 24/10
                                       370/252

(Continued)

FOREIGN PATENT DOCUMENTS

JP     2016040939 A     3/2016
WO    2011120585 A1    10/2011

(Continued)

OTHER PUBLICATIONS

Nokia et al., "Detailed analysis of LTE QMC CP solution 4 and 5", 3GPP TSG-RAN WG2 #99bis, Prague, Czech Republic, Oct. 9-13, 2017, pp. 1-6, R2-1711688.

(Continued)

*Primary Examiner* — Kent Krueger
(74) *Attorney, Agent, or Firm* — COATS & BENNETT, PLLC

(57) ABSTRACT

A technique for Quality of Experience (QoE) or Application Layer (AL) measurements at high load is described. As to one method aspect of the technique for reporting QoE measurements from a radio device (100) wirelessly connected or connectable to a radio access network, RAN (200), the method (400) comprises or initiates a step of receiving (402; 810) a stop control message (808) from or through the RAN (200) at the radio device (100), the stop control message (808) being indicative of a command for storing (Continued)

(404) results of the QoE or AL measurements at the radio device (100) and stopping (406) the radio device (100) from reporting (408) the stored results of the QoE or AL measurements to or through the RAN.

17 Claims, 11 Drawing Sheets

(56) References Cited

U.S. PATENT DOCUMENTS

| | | | | |
|---|---|---|---|---|
| 2013/0268577 | A1* | 10/2013 | Oyman | H04L 65/1069 709/203 |
| 2020/0092762 | A1* | 3/2020 | Shi | H04W 36/32 |
| 2020/0162949 | A1* | 5/2020 | He | H04L 41/0896 |
| 2022/0361028 | A1* | 11/2022 | Van Phan | H04W 4/44 |

FOREIGN PATENT DOCUMENTS

| | | |
|---|---|---|
| WO | 2019030737 A1 | 2/2019 |
| WO | 2019106055 A1 | 6/2019 |
| WO | 2020128657 A1 | 6/2020 |

OTHER PUBLICATIONS

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 15)", Technical Specification, 3GPP TS 36.331 V15.6.0, Jun. 1, 2019, pp. 1-960, 3GPP.

3rd Generation Partnership Project, "3rd Generation Partnership Project; Technical Specification Group Services and System Aspects; Telecommunication management; Quality of Experience (QoE) measurement collection; Control and configuration (Release 16)", Technical Specification, 3GPP TS 28.405 V0.7.0, Apr. 1, 2019, pp. 1-18, 3GPP.

3rd Generation Partnership Project, "3rd Generation Partnership Project; Technical Specification Group Services and System Aspects; Telecommunication management; Quality of Experience (QoE) measurement collection Integration Reference Point (IRP); Information Service (IS) (Release 15)", Technical Specification, 3GPP TS 28.308 V0.1.0, Oct. 1, 2017, pp. 1-22, 3GPP.

3rd Generation Partnership Project, "3rd Generation Partnership Project, Technical Specification Group Services and System Aspects; Telecommunication management; Control and monitoring of Power, Energy and Environmental (PEE) parameters Integration Reference Point (IRP); Information Service (IS) (Release 15)", Technical Specification, 3GPP TS 28.305 V15.1.0, Dec. 1, 2018, pp. 1-29, 3GPP.

3rd Generation Partnership Project, "3rd Generation Partnership Project; Technical Specification Group Core Network and Terminals; AT command set for User Equipment (UE) (Release 15)", Technical Specification, 3GPP TS 27.007 V.15.3.0, Sep. 1, 2018, pp. 1-381, 3GPP.

3rd Generation Partnership Project, "3rd Generation Partnership Project, Technical Specification Group Services and System Aspects; Transparent end-to-end Packet-switched Streaming Service (PSS); Progressive Download and Dynamic Adaptive Streaming over HTTP (3GP-DASH) (Release 16)", Technical Specification, 3GPP TS 26.247 V16.0.0, Sep. 1, 2018, pp. 1-137, 3GPP.

3rd Generation Partnership Project, "3rd Generation Partnership Project; Technical Specification Group Core Network and Terminals; AT command set for User Equipment (UE) (Release 16)", Technical Specification, 3GPP TS 27.007 V.16.1.0, Jun. 1, 2019, pp. 1-393, 3GPP.

3rd Generation Partnership Project, "3rd Generation Partnership Project; Technical Specification Group Services and System Aspects; Telecommunication management; Quality of Experience (QoE) measurement collection; Concepts, use cases and requirements (Release 16)", Technical Specification, 3GPP TS 28.404 V1.1.0, Jul. 1, 2019, pp. 1-11, 3GPP.

China Unicom et al., "New WI proposal: Quality of Experience (QoE) Measurement Collection for streaming services in E-UTRAN", 3GPP TSG RAN Meeting #75, Dubrovnik, Croatia, Mar. 6, 2017, pp. 1-5, RP-170786, 3GPP.

SA WG5, "Revised WID on Management of QoE measurement collection", 3GPP TSG SA Meeting #82, Sorrento, Italy, Dec. 12, 2018, pp. 1-4, SP-181069, 3GPP.

Ericsson, "AT-commands for application level measurement reporting", 3GPP TSG-CT WG1 Meeting #107, Reno, USA, Nov. 27, 2017, pp. 1-10, C1-174682, 3GPP.

Ericsson, "Start and stop of QoE Measurements", 3GPP TSG RAN WG2 #99bis, Prague, Czech Republic, Oct. 9, 2017, pp. 1-4, R2-1710506, 3GPP.

Nokia et al., "Consideration on QMC for steaming in UTRAN", 3GPP TSG-RAN WG2 Meeting #96, Reno, USA, Nov. 14, 2016, pp. 1-4, R2-168138, 3GPP.

* cited by examiner

TECHNIQUE FOR REPORTING QUALITY OF EXPERIENCE (QoE)—AND APPLICATION LAYER (AL) MEASUREMENTS AT HIGH LOAD

TECHNICAL FIELD

The present disclosure generally relates to a technique for Quality of Experience measurements or Application Layer measurements. More specifically, and without limitation, methods and devices are provided for Quality of Experience measurements or Application Layer measurements at high load in a radio access network.

BACKGROUND

Release 15 of the Third Generation Partnership Project (3GPP) relates to radio devices (e.g., user equipments, UEs) and corresponding radio access networks (RANs) according to Long Term Evolution (LTE) as a fourth generation (4G) radio access technology (RAT) and includes a first full set of specifications for New Radio (NR) as a fifth generation (5G) RAT. A work item on "Quality of Experience (QoE) Measurement Collection" for 3GPP LTE was approved in 3GPP Release 15, which is a technique that deserves further development inter alia in the context of 3GPP NR. The work item was not completed in 3GPP Release 15 and is currently continuing in 3GPP Release 16. For example, QoE Measurement Collection is introduced for streaming services and Multimedia Telephony Services for IMS (MTSI services), i.e., services for an IP Multimedia Subsystem (IMS).

By way of example, the purpose of the work item is to start measurements in the UE to collect information about a quality of streaming services used by the UE. The streaming service is typically a 3rd-party streaming application on top of a packet-switched (PS) Interactive Radio Access Bearer (RAB) defined in the RAN. The purpose of the measurement collection is to be able to improve the quality of the streaming service.

The problem with the existing techniques, e.g., those proposed in the work item, is that no QoE measurements or AL measurements are collected when there is an overload in the RAN, e.g., as the current mechanism implies that the UE discards any buffered report as well as deletes the measurement configuration file. QoE measurements or AL measurements at high load may in fact be crucial in addressing customer complaints as well as the general understanding how well a certain service behaves under various conditions.

SUMMARY

Accordingly, there is a need for a Quality of Experience measurement technique that covers situations of high load in a radio access network.

As to a first method aspect, a method of reporting Quality of Experience (QoE) measurements or Application Layer (AL) measurements from a radio device wirelessly connected or connectable to a radio access network (RAN) is provided. The method comprises or initiates a step of receiving a stop control message from or through the RAN at the radio device. The stop control message is indicative of a command for storing results of the QoE measurements or AL measurements at the radio device and for stopping the radio device from reporting the stored results of the QoE measurements or AL measurements to or through the RAN.

The method may further comprises or initiates a step of starting to perform or continuing to perform the QoE measurements or AL measurements at the radio device after or responsive to receiving the stop control message. Alternatively or in addition, the method may further comprises or initiates a step of storing results of the QoE measurements or AL measurements at the radio device. Alternatively or in addition, the method may further comprises or initiates a step of stopping the reporting of the results of the QoE measurements or AL measurements to or through the RAN.

Storing the results of the QoE measurements or AL measurements at the radio device may comprise or may be implemented by buffering the results of the QoE measurements or AL measurements at the radio device, e.g., at an application layer of the radio device. The QoE measurements or AL measurements may be buffered in a ring buffer and/or for a limited period of time.

The stop control message may relate to temporarily stopping the reporting. Alternatively or in addition, the stop control message may be indicative of a time period for restarting the reporting.

The stop control message may be implemented by RRC-ConnectionReconfiguration (e.g., in 3GPP LTE) and/or RRCReconfiguration (e.g., in NR). Alternatively or in addition, the stop control message may be implemented extending an RRC specifications 3GPP TS 36.331 and/or 3GPP TS 38.331, respectively.

The radio device may maintain a configuration for performing the QoE measurements or AL measurements after receiving the stop control message. The method may further comprise or initiate a step of maintaining a configuration (e.g., configuration files) for the QoE measurements or AL measurements. The configuration may be indicative of parameters for at least one of performing the QoE measurement and reporting the QoE measurements or AL measurements.

The method may further comprises or initiates a step of receiving a restart control message from or through the RAN at the radio device. The restart control message may be indicative of a command for reporting results of the QoE measurements or AL measurements stored at the radio device to or through the RAN.

The method may further comprise or initiate the step of reporting the results of the QoE measurements or AL measurements before receiving the stop control message and/or after receiving the restart control message.

At least one of the stop control message and the restart control message is further indicative of an application or a service type for which the QoE measurements or AL measurements are performed.

At least one of the stop control message and the restart control message may further be indicative of a level of an overload at the RAN, and/or a congestion at the RAN, and/or an interference at the RAN.

The reporting may be stopped to an extent that depends on the indicated level. Measurement reports transmitted to or through the RAN may be indicative of the level, and/or the service type, and/or the application.

The results of the QoE measurements or AL measurements may be stored in association with location information of the radio device. The measurement reports transmitted responsive to the restart control message may be indicative of the location information.

As to a second aspect, a method of performing Quality of Experience (QoE) measurements or Application Layer (AL) measurements at a radio device wirelessly connected or connectable to a radio access network (RAN) is provided. The method comprises or triggers a step of sending a stop control command from an access stratum layer of the radio device to an application layer of the radio device. The stop control command is indicative of a command for storing results of the QoE measurements or AL measurements at the radio device and for stopping the radio device from reporting the stored results of the QoE measurements or AL measurements to or through the RAN.

The stop control command may be an Attention command or AT command, e.g., according to the document 3GPP TS 27.007, version 15.3.0 or 16.1.0, and/or according to a Recommendation V.250 of the Telecommunications Standardization Sector of the International Telecommunication Union (ITU-T).

The stop control command may comprise or may be implemented by a container that is forwarded to the radio device transparently for the RAN.

The access stratum layer may comprise a terminal adapter, and/or a radio modem, and/or a baseband processor.

The Terminal Adaptor (TA) may comprise a modem or data card or may be equal to Data Circuit terminating Equipment (DCE).

The application layer may comprise an application processor and memory. The memory may be operatively coupled to the application processor and encoded with at least one of a mobile operating system and an application for performing the QoE measurements or AL measurements at the radio device.

The UE may be a Terminal Equipment (TE), e.g., a computer or equal to a Data Terminal Equipment (DTE). The AT command for ("Attention" command) may comprise a two-character abbreviation, which may be used to start a command line to be sent from a TE to a TA.

The method may further comprise or initiate a step of sending a restart control command from the access stratum layer of the radio device to the application layer of the radio device. The restart control command may be indicative of a command for reporting results of the QoE measurements or AL measurements stored at the radio device to or through the RAN.

At least one of the stop control command and the restart control command may be further indicative of an application and/or a service type for which the QoE measurements or AL measurements are performed. Alternatively or in addition, at least one of the stop control command and the restart control command may be further indicative of an overload at the RAN, and/or a congestion at the RAN and/or an interference at the RAN.

The reporting may be stopped to an extent that depends on the indicated level.

As to a third method aspect, a method of reporting Quality of Experience (QoE) measurements or Application Layer (AL) measurements from a radio device wirelessly connected or connectable to a radio access network (RAN) and/or performing the QoE measurements or AL measurements at the radio device is provided. The method comprises or initiates a step of receiving a stop control message from or through the RAN at the radio device. The stop control message is indicative of a command for storing results of the QoE measurements or AL measurements at the radio device and for stopping the radio device from reporting the stored results of the QoE measurements or AL measurements to or through the RAN. Alternatively or in addition, the method comprises or triggers a step of sending a stop control command from an access stratum layer of the radio device to an application layer of the radio device. The stop control command is indicative of a command for storing results of the QoE measurements or AL measurements at the radio device and for stopping the radio device from reporting the stored results of the QoE measurements or AL measurements to or through the RAN.

The method may further comprise or trigger at least one of the steps of any embodiment of the first method aspect and/or the second method aspect.

As to a fourth method aspect, a method of controlling a reporting of Quality of Experience (QoE) measurements or Application Layer (AL) measurements from at least one radio device wirelessly connected or connectable to a radio access network (RAN). The method comprises or initiates a step of transmitting a stop control message from or through the RAN to the radio device, the stop control message being indicative of a command for storing results of the QoE measurements or AL measurements at the radio device and stopping the radio device from reporting the stored results of the QoE measurements or AL measurements to or through the RAN.

The stop control message may be indicative of a command for immediately stopping the radio device from reporting the stored results of the QoE measurements or AL measurements to or through the RAN.

The stop control message may be indicative of a command for stopping the radio device from reporting the stored results of the QoE measurements or AL measurements to or through the RAN for a period of time and/or until occurrence of an event. Optionally, the stop control message and/or a QoE configuration stored at the radio device may be indicative of the period of time and/or may be indicative of the event.

The reporting may be postponed or delayed according to the period of time and/or until the occurrence of the event. The reporting may be temporarily stopped according to the period of time and/or until the occurrence of the event.

The stop control message may trigger the radio device to maintain a QoE configuration that is indicative of parameters for at least one of performing the QoE measurements or AL measurements and reporting the stored results of the QoE measurements or AL measurements.

The method may further comprise or initiate a step of determining an overload in the RAN. The stop control message may be transmitted responsive to the determination of the overload in the RAN.

The overload may be determined by a RAN node of the RAN. Alternatively or in addition, the overload may relate to a RAN node of the RAN. Optionally, the RAN node may be a serving RAN node, e.g., that is serving the radio device.

The method may further comprise or initiate a step of responsive to the determination of the overload in the RAN. Alternatively or in addition, the method may further comprise or initiate a step of sending a notification to an operations node associated with the RAN. The notification may be indicative of the QoE measurements or AL measurements reporting being temporarily stopped.

The stop control message may trigger the radio device to stop the reporting of the results, e.g., during the overload in the RAN.

The method may further comprise or initiate a step of transmitting a restart control message from the RAN to the radio device. The restart control message may be indicative of a command for starting or restarting a reporting of the stored results of the QoE measurements or AL measurements, e.g., from the radio device to or through the RAN.

The method may further comprise or initiate a step of determining an end of an overload in the RAN. The restart control message may be transmitted responsive to the determination of the end of the overload in the RAN.

The method may further comprise or initiate a step of sending, responsive to the determination of the end of the overload in the RAN, a notification to an operations node associated with the RAN. The notification may be indicative of the QoE measurements or AL measurements reporting being restarted.

The notification indicative of the temporary stop and/or the notification indicative of the restart may be further indicative of a level of an overload at the RAN, and/or a congestion at the RAN and/or an interference at the RAN.

The stop control message, and/or the restart control message, and/or the notification indicative of the temporary stop, and/or the notification indicative of the restart may be transmitted or sent from a RAN node of the RAN. The RAN node, to which it is transmitted or sent, may be subject of the overload.

The stop control message may trigger the radio device to report the results of the QoE measurements or AL measurements before receiving the stop control message and/or after receiving the start control message.

The method may further comprise or initiate a step of sending a notification from the RAN to an operations node. The notification may be indicative of starting or restarting the QoE measurements or AL measurements and/or may be indicative of storing the results of the QoE measurements or AL measurements.

The sending of the notification may be triggered by receiving a streaming indication from the radio device, preferably from the access stratum layer of the radio device.

As to a fifth method aspect, a method of acquiring Quality of Experience (QoE) measurements or Application Layer (AL) measurements from a radio access network (RAN) is provided. The method comprises or initiates a step of receiving, from or through the RAN, a report of results of the QoE measurements or AL measurements. The report is indicative of an overload at the RAN.

The indicated overload may relate to an overload of the RAN that has ended. The reported results may relate to QoE measurements or AL measurements performed during the overload.

The report may be received responsive to an end of the overload status at the RAN.

The method may further comprise or initiate a step of receiving, from the RAN, a notification indicative of the QoE measurements or AL measurements reporting being temporarily stopped. Alternatively or in addition, the method may further comprise or initiate a step of receiving, from the RAN, a notification indicative of the QoE measurements or AL measurements reporting being restarted.

The report of the QoE measurements or AL measurements, and/or the notification indicative of the temporary stop, and/or the notification indicative of the restart may be further indicative of at least one of a level of the overload, a level of a congestion, a level of an interference at the RAN, a timestamp of when QoE measurement reporting has been stopped and/or restarted, and an overall fraction of the duration of the stop over the total duration of the QoE measurements or AL measurements.

The method may be performed by an operations node of the RAN (preferably an Operations, Administration and Maintenance, OAM, node), and/or a Network Manager (NM), and/or a Domain Manager (DM), and/or and a Measurement Collection Entity (MCE).

Results of several QoE measurements or AL measurements from the radio device may be simultaneously acquired. Alternatively or in addition, the report may comprise results of several QoE measurements or AL measurements from the radio device.

The method may further comprise or initiate a step of receiving a notification from the RAN indicative of starting or restarting the QoE measurements or AL measurements and/or indicative of storing the results of the QoE measurements or AL measurements. The notification may be triggered by the application layer sending a control command to the access stratum layer, optionally the control command including a streaming indication.

In any aspect, the result of the QoE measurements or AL measurements may comprise an indicator of quality, reliability, operation, status, responsiveness, latency, and/or performance of a service and/or an application.

The QoE measurements or AL measurements may encompass any measurements relating to the quality, reliability, operation, status, responsiveness, latency, and/or performance of a service and/or an application that is performed by the radio device and/or using the radio device. Alternatively or in addition, the QoE measurements or AL measurements may encompass any measurements relating to the quality, reliability, operation, status, responsiveness, latency, and/or performance of a service and/or an application that uses a radio link (e.g., an uplink and/or a downlink) between the radio device and the RAN and/or that uses a radio link (e.g., a sidelink to another radio device and/or a secondary link to a secondary RAN node other than a primary or serving RAN node), which is controlled (e.g., scheduled) by the RAN (e.g., by the primary or serving RAN node). Alternatively or in addition, the QoE measurements or AL measurements may encompass any application layer measurement. An application layer of the radio device may perform the QoE measurements or AL measurements.

The AL measurements may include QoE measurements done in the application layer. Optionally, the AL measurements may contain other measurements that are not QoE measurements, e.g. a time (or duration) when a streaming was paused by the user.

Embodiments of the technique may be implemented as a method of collecting QoE measurements or AL measurements at high load, e.g., when the RAN is under high load.

The wireless connection (e.g., the radio link) between the radio device and the RAN may be implemented using or may compatible with High Speed Packet Access (HSPA), 3GPP LTE, 3GPP NR.

Enhancement of the current QoE measurement collection procedure comprise at least one of: Signaling from the RAN to the UE to temporarily stop/re-start reporting (e.g., in RAN2); signaling from the UE Access Stratum layer to the application layer to indicate a temporary stop/re-start of the reporting (e.g., in CT1); Signaling from the RAN to the network management layer to indicate to the network management layer that QoE measurement reporting has been temporarily stopped or re-started (or something similar/equivalent such as the RAN entering/exiting high load) (e.g., in SA5); an indication in the QoE measurement report sent from the UE to the MCE indicating that overload has occurred during the collection of the report. The indication may also include an estimation of the amount of time reporting has been suspended during the QoE measurement (e.g., in SA4); an indication in the QoE measurement report sent from the UE to the MCE indicating if part of the QoE measurement is taken outside of the measurement area (e.g., in SA4).

The technique may be implemented at one or more radio devices, and/or at a radio access network (RAN) serving the one or more radio devices. The method may be performed by a radio device, or by a base station or a cell of the RAN. The base station may encompass any station that is configured to provide radio access to the radio device. The base station or cell of the RAN may serve a plurality of radio devices, e.g., each implementing the technique.

The radio device may be configured for peer-to-peer communication (e.g., on a sidelink) and/or for accessing the RAN (e.g. on an uplink and/or a downlink). The radio device may be a user equipment (UE, e.g., a 3GPP UE), a mobile or portable station (STA, e.g. a Wi-Fi STA), a device for machine-type communication (MTC), a device for narrowband Internet of Things (NB-IoT) or a combination thereof. Examples for the UE and the mobile station include a mobile phone and a tablet computer. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in household appliances and consumer electronics. Examples for the combination include a self-driving vehicle, a door intercommunication system and an automated teller machine.

Examples for the base station may include a 3G base station or Node B, 4G base station or eNodeB, a 5G base station or gNodeB, an access point (e.g., a Wi-Fi access point) and a network controller (e.g., according to Bluetooth, ZigBee or Z-Wave).

The RAN may be implemented according to the Global System for Mobile Communications (GSM), the Universal Mobile Telecommunications System (UMTS), Long Term Evolution (LTE) and/or New Radio (NR).

The technique may be implemented on a Physical Layer (PHY), a Medium Access Control (MAC) layer, a Radio Link Control (RLC) layer and/or a Radio Resource Control (RRC) layer of a protocol stack for the radio communication.

As to another aspect, a computer program product is provided. The computer program product comprises program code portions for performing any one of the steps of any one of the method aspects disclosed herein when the computer program product is executed by one or more computing devices. The computer program product may be stored on a computer-readable recording medium. The computer program product may also be provided for download via a data network, e.g., via the RAN and/or via the Internet and/or by the base station. Alternatively or in addition, the method may be encoded in a Field-Programmable Gate Array (FPGA) and/or an Application-Specific Integrated Circuit (ASIC), or the functionality may be provided for download by means of a hardware description language.

As to a first device aspect, a radio device for reporting Quality of Experience (QoE) measurements or Application Layer (AL) measurements from a radio device wirelessly connected or connectable to a radio access network (RAN) is provided. The radio device is configured to receive a stop control message from or through the RAN at the radio device. The stop control message is indicative of a command for storing results of the QoE or AL measurements at the radio device and stopping the radio device from reporting the stored results of the QoE or AL measurements to or through the RAN.

The device may further be configured to perform the steps of any embodiment of the first method aspect.

As to a second device aspect, a radio device for performing Quality of Experience (QoE) measurements or Application Layer (AL) measurements at a radio device wirelessly connected or connectable to a radio access network (RAN) is provided. The radio device is configured to send a stop control command from an access stratum layer of the radio device to an application layer of the radio device. The stop control command is indicative of a command for storing results of the QoE or AL measurements at the radio device and stopping the radio device from reporting the stored results of the QoE or AL measurements to or through the RAN.

The device may further be configured to perform the steps of any embodiment of the second method aspect.

As to a third device aspect, a radio device for at least one of reporting Quality of Experience (QoE) measurements or Application Layer (AL) measurements from a radio device wirelessly connected or connectable to a radio access network (RAN) and performing the QoE measurements or AL measurements at the radio device is provided. The radio device is configured to receive a stop control message from or through the RAN at the radio device. The stop control message is indicative of a command for storing results of the QoE or AL measurements at the radio device and stopping the radio device from reporting the stored results of the QoE or AL measurements to or through the RAN. Alternatively or in addition, the radio device is configured to send a stop control command from an access stratum layer of the radio device to an application layer of the radio device. The stop control command is indicative of a command for storing results of the QoE or AL measurements at the radio device and stopping the radio device from reporting the stored results of the QoE or AL measurements to or through the RAN.

The radio device may further be configured to perform or initiate at least one of the steps of any embodiment of the first method aspect and/or the second method aspect.

As to a fourth device aspect, a RAN node for controlling a reporting of Quality of Experience (QoE) measurements or Application Layer (AL) measurements from at least one radio device wirelessly connected or connectable to a radio access network (RAN) is provided. The RAN node is configured transmit a stop control message from or through the RAN to the radio device, the stop control message being indicative of a command for storing results of the QoE or AL measurements at the radio device and stopping the radio device from reporting the stored results of the QoE or AL measurements to or through the RAN.

The RAN node may further be configured to perform or initiate the steps of any embodiment of the fourth method aspect.

As to a fifth device aspect, an operations node for acquiring Quality of Experience (QoE) measurements or Application Layer (AL) measurements from a radio access network (RAN) is provided. The operations node is configured to receive, from or through the RAN, a report of results of the QoE or AL measurements, wherein the report is indicative of an overload at the RAN.

The operations node may further be configured to perform or initiate the steps of any embodiment of the fifth method aspect.

As to a still further aspect, a user equipment (UE) configured to communicate with a base station is provided. UE comprises a radio interface and processing circuitry configured to receive a stop control message from or through the RAN at the UE. The stop control message is indicative of a command for storing results of the QoE or AL measurements at the UE and stopping the radio device from reporting the stored results of the QoE or AL measurements to or through the RAN. Alternatively or in addition, the processing circuitry is configured to send a stop control command from an access stratum layer of the UE to an application layer of the UE. The stop control command is indicative of a command for storing results of the QoE or AL measurements at the UE and stopping the UE from reporting the stored results of the QoE or AL measurements to or through the RAN.

The processing circuitry may further be configured to execute any of the steps of any embodiment of the first, second or third method aspect.

As to a still further aspect a communication system including a host computer is provided. The host computer may comprise a processing circuitry configured to provide user data. The host computer may further comprise a communication interface configured to forward user data to a cellular network for transmission to a user equipment (UE), wherein the UE comprises a radio interface and processing circuitry. The processing circuitry of the UE is configured to receive a stop control message from or through the RAN at the UE. The stop control message is indicative of a command for storing results of the QoE or AL measurements at the UE and stopping the radio device from reporting the stored results of the QoE or AL measurements to or through the RAN. Alternatively or in addition, the processing circuitry of the UE is configured to send a stop control command from an access stratum layer of the UE to an application layer of the UE. The stop control command is indicative of a command for storing results of the QoE or AL measurements at the UE and stopping the UE from reporting the stored results of the QoE or AL measurements to or through the RAN.

The processing circuitry of the UE may further be configured to execute any one of the steps of the method aspect.

The communication system may further include the UE. Alternatively or in addition, the cellular network may further include a base station configured to communicate with the UE.

The processing circuitry of the host computer may be configured to execute a host application, thereby providing the user data. Alternatively or in addition, the processing circuitry of the UE may be configured to execute a client application associated with the host application.

As to a still further aspect a method implemented in a user equipment (UE) is provided. The method comprises or initiates a step of receiving a stop control message from or through the RAN at the radio device. The stop control message is indicative of a command for storing results of the QoE measurements or AL measurements at the radio device and for stopping the radio device from reporting the stored results of the QoE measurements or AL measurements to or through the RAN. Alternatively or in addition, the method comprises or triggers a step of sending a stop control command from an access stratum layer of the radio device to an application layer of the radio device. The stop control command is indicative of a command for storing results of the QoE measurements or AL measurements at the radio device and for stopping the radio device from reporting the stored results of the QoE measurements or AL measurements to or through the RAN.

The method may further comprise any of the steps of any embodiment of the first, second or third method aspect.

The device, the UE, the system or any node or station for embodying the technique may further include any feature disclosed in the context of the method aspect, and vice versa. Particularly, any one of the units and modules, or a dedicated unit or module, may be configured to perform or trigger one or more of the steps of any one of the method aspect.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for 3GPP LTE or a successor thereof, it is readily apparent that the technique described herein may also be implemented in any other radio network, including a New Radio (NR) or 5G implementation, Wireless Local Area Network (WLAN) according to the standard family IEEE 802.11, Bluetooth according to the Bluetooth Special Interest Group (SIG), particularly Bluetooth Low Energy and Bluetooth broadcasting, and/or ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
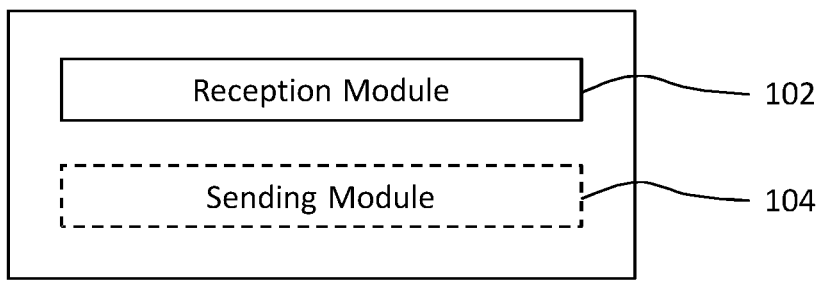
FIG. 1 shows a schematic block diagram of an embodiment of a radio device for at least one of reporting QoE measurements or AL measurements from a radio device to a RAN and performing QoE measurements or AL measurements at the radio device.

FIG. 1 schematically illustrates a block diagram of a radio device a radio device 100 for reporting Quality of Experience, QoE, measurements from a radio device 100 wirelessly connected or connectable to a radio access network, RAN, configured to perform the steps of any one of the embodiments of the first method aspect.

Alternatively or in addition, FIG. 1 schematically illustrates a block diagram of a radio device a radio device 100 for performing Quality of Experience, QoE, measurements at a radio device 100 wirelessly connected or connectable to a radio access network, RAN, configured to perform the steps of any one of the embodiments of the second method aspect.

For example, the radio device 100 comprises a reception module 102 for receiving a stop control message from or through the RAN at the radio device 100. Optionally, the radio device 100 comprises a sending module 104 for sending a stop control command from an access stratum layer of the radio device 100 to an application layer of the radio device 100.

Alternatively or in addition, FIG. 1 schematically illustrates a block diagram of a radio device a radio device 100 for at least one of reporting Quality of Experience, QoE, measurements from a radio device 100 wirelessly connected or connectable to a radio access network, RAN, and performing the QoE measurements at the radio device 100, the radio device being configured to perform or initiate at least one of the steps of any one of the embodiments of the first method aspect and/or the second method aspect.

Figure 2:
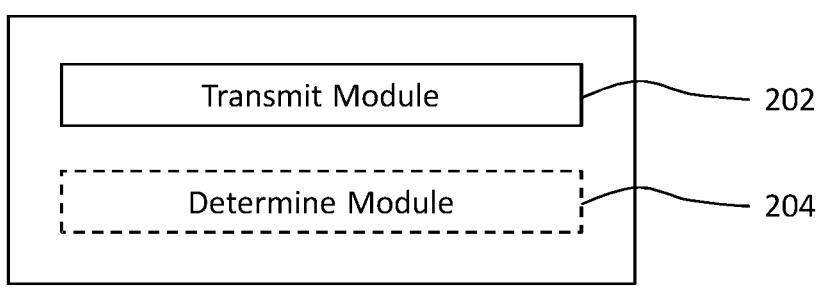
FIG. 2 shows a schematic block diagram of an embodiment of a RAN node for controlling a reporting of QoE measurements or AL measurements from at least one radio device to a RAN.

FIG. 2 schematically illustrates a block diagram of a RAN node 200 for controlling a reporting of Quality of Experience, QoE, measurements from at least one radio device 100 wirelessly connected or connectable to a radio access network, RAN, the RAN node 200 being configured to perform or initiate the steps of any one of the embodiments of the fourth method aspect.

For example, the RAN node 200 comprises a transmit module 202 for transmitting a stop control message from or through the RAN to the radio device 100. Optionally, the RAN node 200 comprises a determine module 204 for determining an overload in the RAN.

Figure 3:
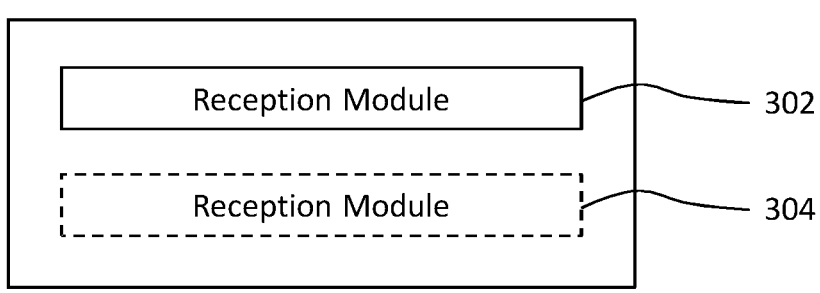
FIG. 3 shows a schematic block diagram of an embodiment of an operation node for acquiring QoE measurements or AL measurements from a RAN.

FIG. 3 schematically illustrates a block diagram of an operations node 300 for acquiring Quality of Experience, QoE, measurements from a radio access network, RAN 200, the operations node 300 being configured to perform or initiate the steps of any one of the embodiments of the fifth method aspect.

For example, the operations node 300 comprises a reception module 302 for receiving, from or through the RAN, a report of results of the QoE measurements. Optionally, the operations node 300 comprises a further reception module 304 for receiving, from the RAN, a notification indicative of the QoE measurements reporting being temporarily stopped and/or restarted.

Figure 4:
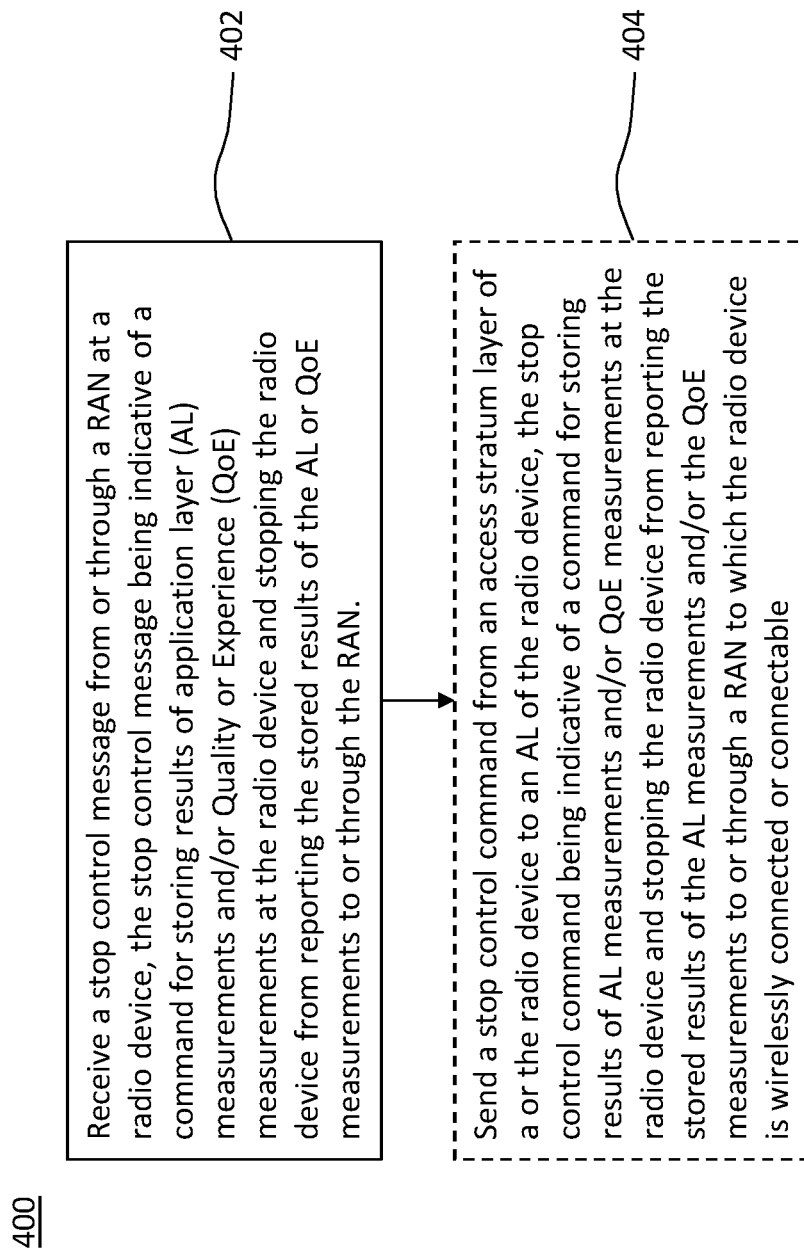
FIG. 4 shows a flowchart for an embodiment of a method of at least one of reporting QoE measurements or AL measurements from a radio device to a RAN and performing QoE measurements or AL measurements at the radio device.
Figure 5:
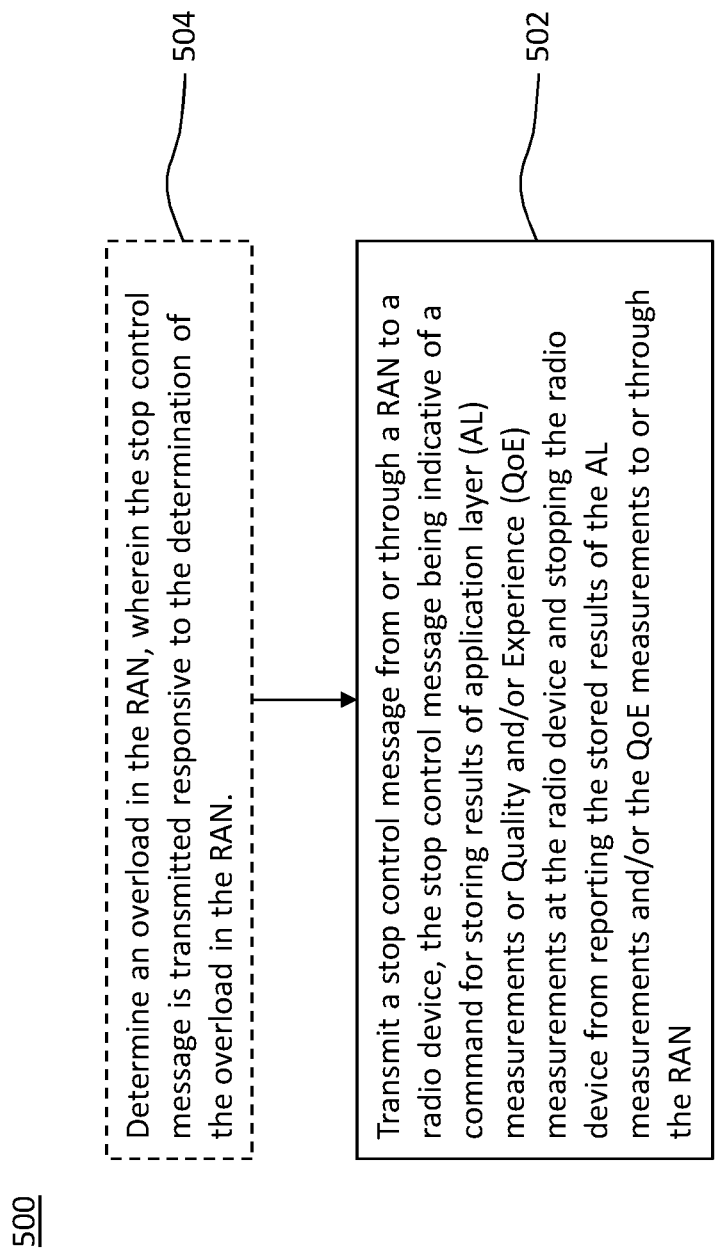
FIG. 5 shows a flowchart for an embodiment of a method of controlling a reporting of QoE measurements or AL measurements from at least one radio device to a RAN.
Figure 6:
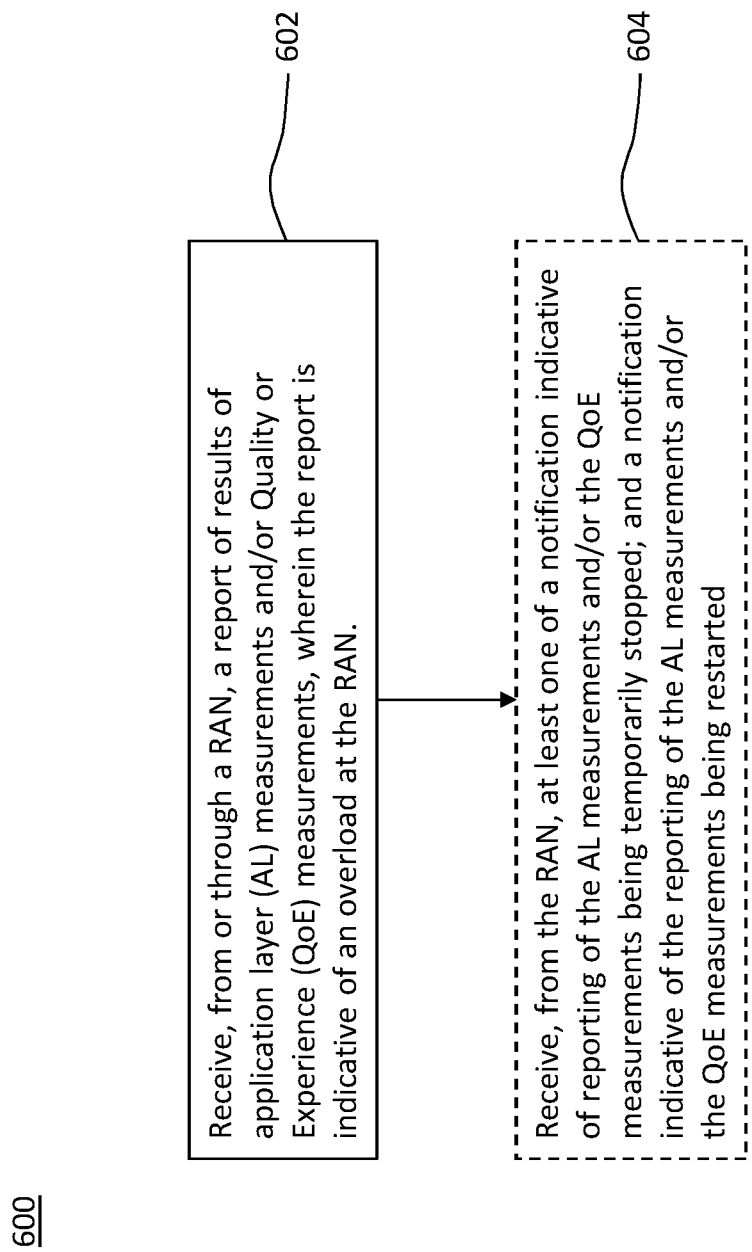
FIG. 6 shows a flowchart for an embodiment of a method of acquiring QoE measurements or AL measurements from a RAN.

FIGS. 4 to 6 show flowcharts of methods 400, 500 and 600 comprising the steps of the corresponding method embodiments.

A step in a dashed-line box may be an optional step or may be implemented independently from the step in a solid-line box.

Any of the modules of the device 100 may be implemented by units configured to provide the corresponding functionality.

The RAN node 200 may be part of the RAN. The RAN node 200 may be embodied by or at a base station of the RAN, nodes connected to the RAN for controlling the base station or a combination thereof. The RAN may comprise a plurality of base stations including the RAN node 200. Optionally, multiple RAN nodes 200 of the RAN serve the radio device 100, and/or the operations node 300 monitors the operation of the multiple RAN nodes 200 in the RAN. For brevity, and without limitation, the RAN node, the multiple RAN nodes in the RAN and/or the RAN as such are referred by the reference sign 200.

The radio device 100 may be wirelessly connected or connectable to the RAN. The radio device 100 may be embodied by or at a mobile device or terminal device configured for accessing the RAN, for example in a vehicle configured for radio-connected driving. Optionally, the radio device 100 is wirelessly connected or connectable to another radio device, for example another vehicle. The radio device 100 may be embodied by or at a mobile device configured for wireless ad hoc connections, e.g., under radio resource control and/or scheduling from the RAN node 200.

The RAN node 200 may encompass a network controller (e.g., a Wi-Fi access point) or a radio access node (e.g. a 3G Node B, a 4G eNodeB or a 5G gNodeB) of the RAN. The RAN node 200 may be configured to provide radio access. Alternatively or in addition, the radio device 100 may comprise a mobile or portable station or a mobile device connectable to the RAN. The radio device may be a user equipment (UE), a device for machine-type communication (MTC) and/or a device for (e.g., narrowband) Internet of Things (IoT). Two or more radio devices may be configured to wirelessly connect to each other, e.g., in an ad hoc radio network or via 3GPP sidelinks.

The method 400 may be performed by the device 100, e.g., at or using the radio device for accessing the RAN or another radio device. For example, the modules 102 and 104 may perform the steps 402 and 404, respectively.

Embodiments of the radio device 100 may also be configured for stand-alone radio communication, ad hoc radio networks and/or vehicular radio communications (V2X), particularly according to technical specifications of 3GPP including device-to-device (D2D) communications (also referred to as "sidelink" communications) and/or D2D features (also referred to as Proximity Services, ProSe), e.g., according to the documents 3GPP TS 23.303, Version 15.3.0, and 3GPP TS 24.334, Version 15.3.0.

Figure 7:
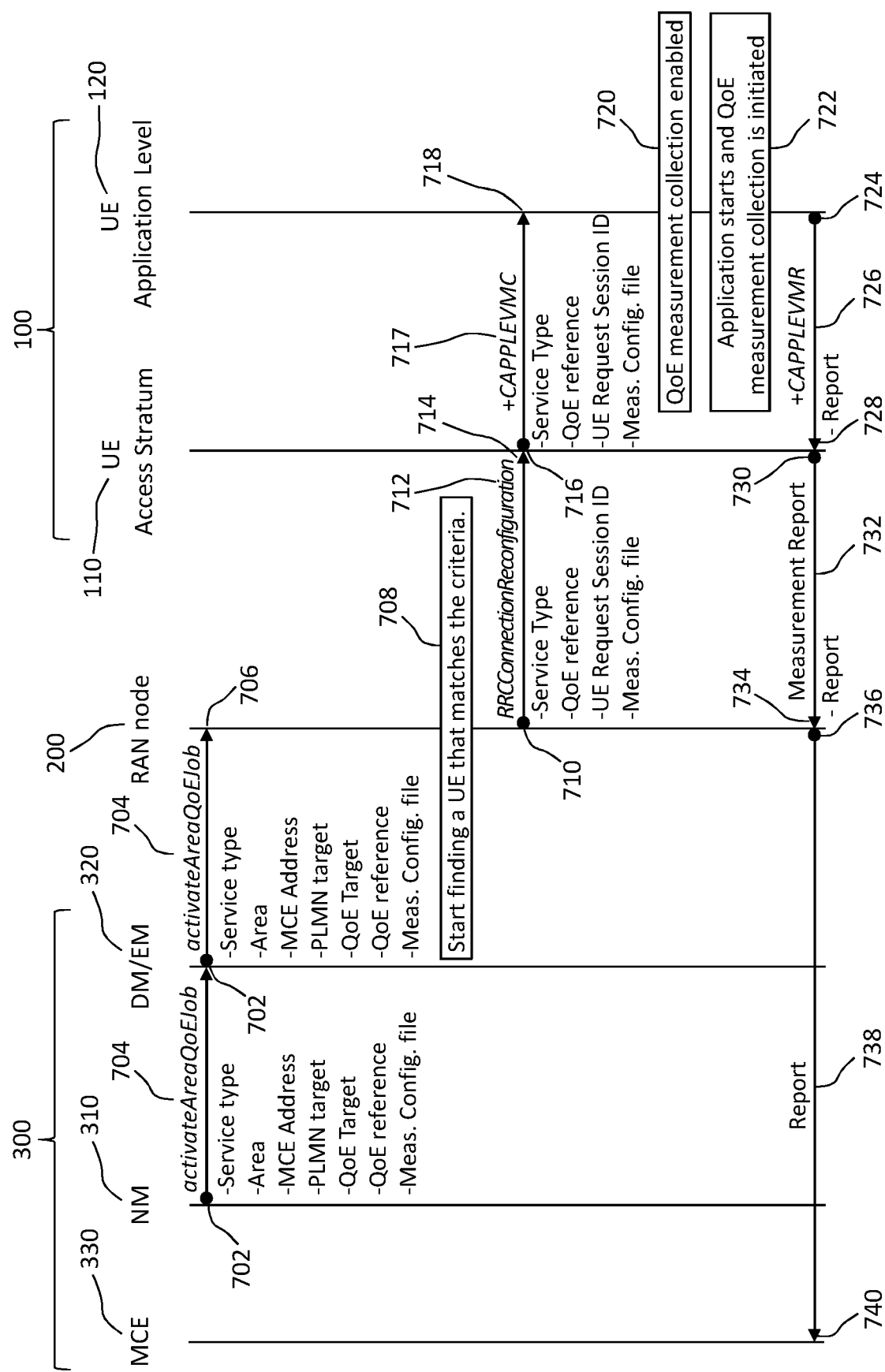
FIG. 7 shows a first example of a schematic signaling diagram resulting from embodiments of the radio device, the RAN node and the operation node in communication.

The operations node 300 may comprise or may be implemented by at least one of a Network Manager (NM) 310, a Domain Manager (DM) 320, and a Measurement Collection Entity (MCE) 330, examples of which are illustrated in FIGS. 7 and 8.

Without limitation, the radio device 100 is described herein as an UE 100.

Herein, starting, triggering, activation and initiation may be used interchangeably. Optionally, starting and stopping may refer to actions of the RAN node 200, while activation may refer to actions of the operations node 300. For example, the activation by the operations node 300 may trigger the starting by the RAN node 200. Moreover, starting and stopping the reporting and/or the QoE measurements may be examples of controlling the QoE measurements.

While the radio device 100, the RAN node 200 and the operations node 300 are described in communication, e.g., with reference to each of the FIGS. 7 and 8, the described features and steps are disclosed individually for each of the radio device 100, the RAN node 200 and the operations node 300.

FIG. 7 shows a first example of a schematic signaling diagram resulting from embodiments of the radio device 100, the RAN node 200 and the operation node 300 in communication. The QoE measurements may be initiated towards the RAN including the RAN node 200 (e.g., towards the RAN node 200) on a management basis. For example, the operation node 300, which may be implemented by an Operation and Maintenance (O&M) node, initiates (e.g., in a generic way) the QoE measurements for a group of radio devices 100 (e.g., UEs). Alternatively or in addition, the QoE measurements may be initiated based on signaling (e.g., signaling dedicated to the radio device). For example, the QoE measurements may be initiated from the O&M node via (e.g., using or through) a core network (CN) to the RAN 200.

In the first example illustrated in FIG. 7, activation of the QoE measurements and reporting of results of the QoE measurements, e.g., on a management basis, is illustrated. Alternatively or in addition, the QoE measurements may be initiated based on signaling or directly from an O&M node 300, i.e., the QoE measurements are triggered in one or more selected UEs 100. By way of example, the QoE measurements are triggered by customer complaints that a certain service is not working well. There may be many reasons for an insufficient QoE for a service, e.g., due to poor radio coverage and/or that the service is not working well when there is high load (e.g., the overload) in the RAN node 200.

In the activation, the O&M node 300 specifies several parameters such as a service type, an area (e.g., one or more cells or nodes of the RAN 200), an MCE address of the MCE 330, and/or a QoE target. Moreover, the configuration of the measurement may include measurement details. The measurement details may be encapsulated in a container that is transparent to the RAN 200, e.g., according to the 3GPP document TS 28.405 (e.g., version 0.7.0).

While FIG. 7 illustrates a first example of the activation of the QoE measurement for LTE, similar signaling may apply to Universal Terrestrial Radio Access Network (UTRAN) or a NR RAN with the difference that the messages and/or reports transmitted from the RAN node 200 to the UE 100 and/or vice versa have different names.

The RAN node 300 may send 702 a management message 704, e.g., activateAreaQoEJob to the RAN node 200. The RAN node 200 receives 706 the management message 704. The management message 704 may comprise at least one of a service type, an area, an MCE address, a Public Land Mobile Network (PLMN) target, QoE target, QoE reference, and a measurement configuration file comprising configuration data for the QoE measurements.

Optionally, the RAN node 200 determines 708 one or more UEs 708 that match criteria specified in the management message 704.

A start control message 712, e.g., an information element (IE) RRCConnectionReconfiguration, may function as a trigger to perform QoE measurements (which may also be referred to as a QoE measurement collection). The start control message 712 may be transmitted 710 from the RAN node 200. The start control message 712 may be received 714 at the UE 100.

The start control message 712 may comprise a configuration to perform the QoE measurements. The configuration may comprise or may be indicative of at least one of a service type of the service to be measured in the QoE measurements, a QoE reference, a request session ID for the UE 100, and a measurement configuration file for the QoE measurement. Alternatively or in addition, the configuration in the start control message 712 may comprise the configuration in the management message 704 or a subset thereof.

For example, the start control message 712 is forwarded 716 to the UE 100 using radio resource control (RRC) signaling. The configuration to perform QoE measurements is provided to the UE 100, e.g., in a container. The container may be specified according to the document 3GPP TS 36.331 (e.g., version 15.6.0, particularly at section 6.3.6 and the field description of measConfigAppLayerContainer).

Reception 714 of the start control message 712 may trigger sending 716 a start control command 717 in the UE 100. The start control command 717 is sent 716 from an access stratum layer 110 of the UE 100 to an application layer 120 (also: application level) of the UE 100. The start control command 717 may correspond to or may comprise the container.

For example, the container is forwarded from the access stratum layer 110 of the UE 100 to the application layer 120 using one or more attention commands (AT commands). The AT command may be specified according to the document 3GPP TS 27.007, version 15.3.0, section 8.78.

Upon reception 718 of the start control command 717, e.g., the container, the application layer 120 enables 720 the QoE measurements (e.g., by setting its configuration according to the received configuration for the QoE measurements). The application layer 120 performs 722 the QoE measurements, which includes storing (i.e., collecting) results of the QoE measurements.

The results are reported 724 from the application layer 120, e.g., a container 726. The results are received at the access stratum layer 110 and transmitted 730 in a measurement report 732 (also briefly: report) to the RAN node 200.

The report 732 is (optionally, after combining or aggregating multiple reports 732 from different UEs 100) sent 736 as a report 738 to the operations node 300, e.g., to the MCE 330. The MCE 330 may receive 740 the report 738, e.g., from multiple UEs 100 and/or multiple cells or RAN nodes 200 of the RAN.

Furthermore, as the size of the report 732 can be fairly large, mechanisms have been introduced to stop and/or start the reporting 728, e.g., whenever there is an overload situation in the RAN 200 (e.g., particularly in the RAN node 200) in order not to further increase the network load and/or interference. The 3GPP document TS 36.331, version 15.6.0, section 5.3.10.9 (e.g., on "Other configuration"), and the 3GPP document TS 27.007, version 16.1.0, section 8.78 (e.g., on "Application level measurement configuration +CAPPLEVMC"), comprise examples of such mechanisms.

For example, when the application layer 120 receives an AT command with the information element (IE)<start-stop_reporting> set to 1, the reporting 724 (and thus the reporting 728) shall be stopped. The existing mechanism, e.g., in 3GPP Universal Mobile Telecommunications System (UMTS) and 3GPP LTE, it means that the storing (i.e., recording) is stopped and the configuration parameters are deleted. For example, the below excerpt from the 3GPP document TS 36.331 specifies that if the UEs receives otherConfig not including measConfigAppLayer, the UE shall clear the stored application layer measurement configuration as well as discard any stored reports.

----------------excerpt from 3GPP TS 36.331 version 15.6.0 section 5.3.10.9------------------------------
   if the received otherConfig includes the measConfigAppLayer:
      2> if measConfigAppLayer is set to setup:
         3> forward measConfigAppLayerContainer to upper layers considering the serviceType;
         3> consider itself to be configured to send application layer measurement report in accordance with
            5.6.19;
      2> else:
         3> inform upper layers to clear the stored application layer measurement configuration;
         3> discard received application layer measurement report information from upper layers;
         3> consider itself not to be configured to send application layer measurement report.
---------------end of excerpt from 3GPP TS 36.331 version 15.6.0 section 5.3.10.9-----------------------

This implies that when the overload occurs, the conventional mechanism causes that no reports will be sent to a server (e.g., the MCE 330) and that all UEs previously activated and/or configured to perform QoE reporting will not do any reporting unless reactivated.

In any embodiment, the QoE measurements may be performed by the application layer 120 for streaming services and/or MTSI services. Alternatively or in addition, (e.g., according in 3GPP releases later than Release 15) other type of services or applications of the application layer 120 may be monitored by the QoE measurements.

While QoE-related measurements are described, illustrated and disclosed herein, the concept of a stop control command and/or a stop control message that stops reporting of the measurements without stopping the storing of the results of the measurements as such may be valid and/or applied for any type of application layer measurements. For example, any disclosure referring to "QoE measurements" herein also discloses, alternatively or in addition, an "application layer measurement".

Application or services, for which the QoE measurements are performed, may comprise streaming services and/or MTSI services. The QoE measurements may relate to streaming services and/or MTSI services, e.g., for 3GPP UMTS or 3GPP LTE, e.g., as specified in the document 3GPP TS 28.404 (e.g., version 1.1.0). Alternatively or in addition, the QoE measurements may be performed for the RAN 200 operating or operative according to 3GPP NR or any 5G RAT. In other words, the described concepts and embodiments are also applicable to 3GPP NR or any 5G RAT.

In a first embodiment, to ensure that QoE measurement reports are also or continuously collected at high load in the RAN, the signaling (e.g., the RRC signaling) may be modified or enhanced to indicate to the UE to temporarily stop QoE reporting or restart QoE reporting.

FIG. 8 shows a second example of a schematic signaling diagram resulting from embodiments of the radio device 100, the RAN node 200 and the operation node 300 in communication. The second example may temporally follow the first example, e.g., when an overload occurs at the RAN node 200. For example, the RAN node 200 may determine 802 an overload (and, optionally, a level of the overload and/or a cause of the overload such as interference) and/or determine 804 that the reporting 728 is to be (e.g., temporarily) stopped, e.g., responsive to the determination 802.

Figure 8A:
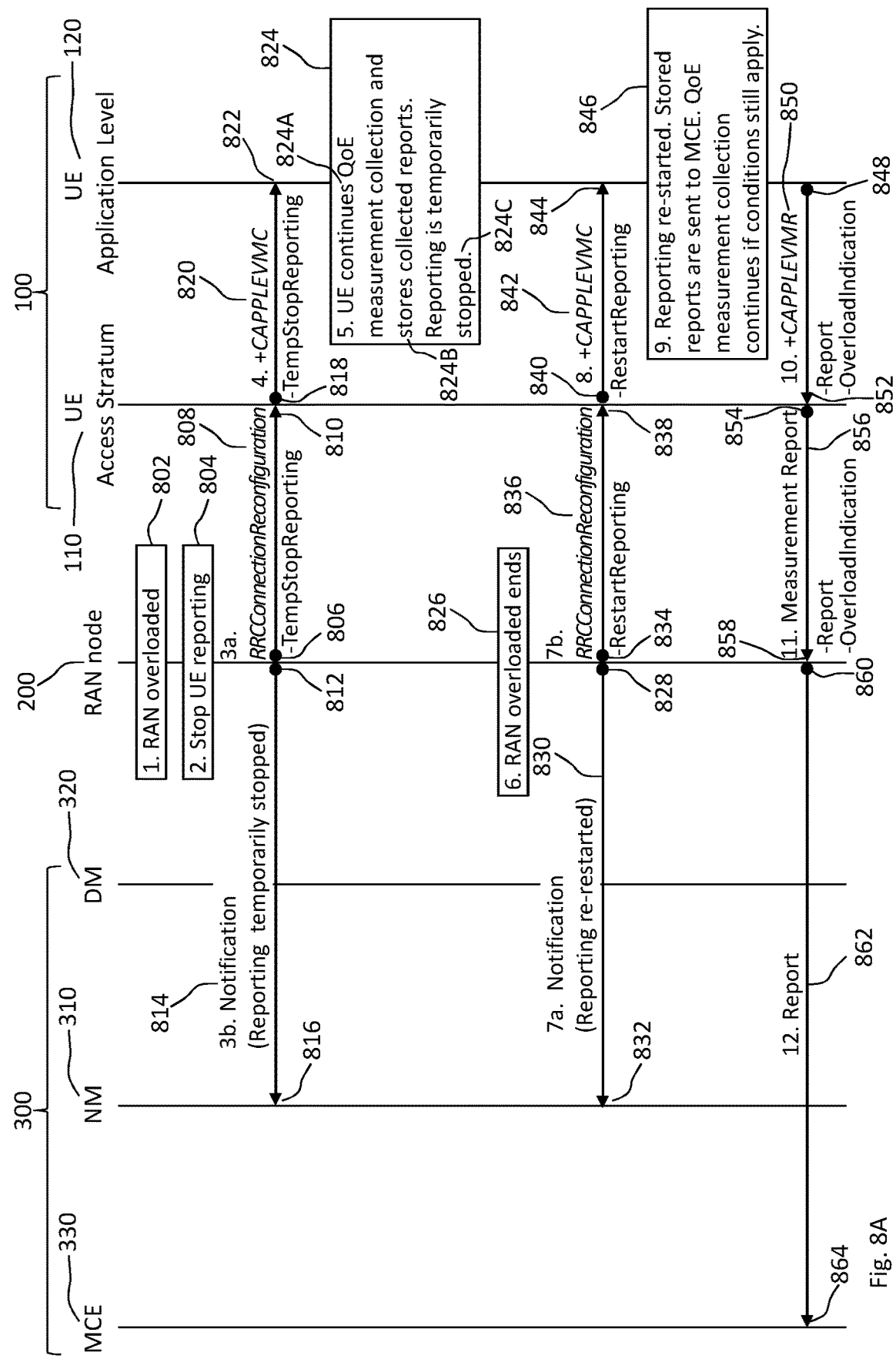
FIG. 8A shows a second example of a schematic signaling diagram resulting from embodiments of the radio device, the RAN node and the operation node in communication.

The modified signaling may comprise the stop control message 808 transmitted 806 from the RAN node 200 to the UE 100, e.g., to the access stratum layer 110. An example thereof is illustrated in FIG. 8A at step 3a. Alternatively or in addition, the modified signaling may comprise the stop control command 820 sent 818 from the access stratum layer 110 of the UE 100 to the application layer 120 of the UE 100. An example thereof is illustrated in FIG. 8A at step 4.

For example, the UE 100 starts to perform or continues 824A to perform the QoE measurements at the radio device 100 after or responsive to receiving the stop control message 808. The UE 100 stores 824B results of the QoE measurements at the UE 100. The UE 100 stops 824C the reporting of the results of the QoE measurements to or through the RAN 200, e.g., the UE stops the reporting temporarily.

Alternatively or in addition, the modified signaling may comprise the restart control message 836 transmitted 834 from the RAN node 200 to the UE 100, e.g., to the access stratum layer 110. An example thereof is illustrated in FIG. 8A at step 7b. Alternatively or in addition, the modified signaling may comprise the restart control command 842 sent 840 from the access stratum layer 110 of the UE 100 to the application layer 120 of the UE 100. An example thereof is illustrated in FIG. 8A at step 8.

For example, the UE 100 receives 838 a restart control message 836 from or through the RAN 200. The restart control message 836 is indicative of a command for reporting 846 results of the QoE measurements, which are stored 824C at the UE 100, to or through the RAN 200. Responsive to the restart control message 836, the access stratum layer 110 sends 840 a restart control command 842 to the application layer 120 of the UE 100. The restart control command 842 is indicative of a command for reporting results of the QoE measurements, which are stored at the radio device, to or through the RAN 200.

The indication to temporary stop 824 and/or restart 846 QoE reporting may be implemented as a temporary stop indication, as an example of the stop control message 820, in the RRCConnectionReconfiguration message. For example, the parameters tempStopReporting and/or restartReporting may be included in the RRCConnectionReconfiguration message, optionally as indicated below.

```
[[  measConfigAppLayer-r15       CHOICE{
        release                  NULL,
        setup                    SEQUENCE{
            measConfigAppLayerContainer-r15    OCTET STRING (SIZE(1..1000)),
            serviceType                        ENUMERATED {qoe, qoemtsi, spare6, spare5,
spare4, spare3, spare2, spare1},
            tempStopReporting    BOOLEAN         OPTIONAL,    -- Need ON
            restartReporting     BOOLEAN         OPTIONAL     -- Need ON
        }
    }   OPTIONAL,   -- Need ON
    ailc-BitConfig-r15           BOOLEAN         OPTIONAL,    -- Need ON
    bt-NameListConfig-r15        BT-NameListConfig-r15        OPTIONAL,    --Need
ON
    wlan-NameListConfig-r15      WLAN-NameListConfig-r15      OPTIONAL     --
Need ON
]]
```

Alternatively, the indication could indicate entering/exiting high load or something similar/equivalent instead of reporting temporarily stopped/re-started.

In a second embodiment the indication also indicates which service type such as streaming, MTSI or similar that is impacted by the temporary stop.

In a third embodiment, the stop/restart indications may be generalized to comprise several levels, e.g., low, medium, and high congestion in addition to whether measurement reporting should be stopped or not.

In another embodiment, the RRC layer in the UE 100 may signal any of the above-mentioned information to the upper layer (e.g., the application layer 120), in which the QoE measurements may be taking place. Any ongoing QoE measurements may include the information in the measurement report. The information can be expressed in the form of a timestamp of when QoE measurement reporting has been stopped and restarted or the reporting stoppage can be reported as an overall fraction of the total duration of the measurement.

When the UE moves to another cell or location, the NW may also inform the UE that it is or is not in the desired measurement area. The RRC layer in the UE may also signal this information to the upper layer where QoE measurements may be taking place. In another embodiment, any ongoing QoE measurements can then include the information in the measurement report. Again, the information can be expressed in the form of a timestamp of when the UE is in or out of the desired measurement area or as an overall fraction of the total duration of the measurement that the UE is inside the desired measurement area.

In another embodiment, e.g., in order to indicate to the operation node 300 (e.g., a network management layer) that the QoE measurement reporting has been temporarily stopped and/or re-started in the RAN 200 due to overload and/or return to normal conditions (e.g., responsive to determining the end of the overload), the RAN 200 sends notifications 814 and 830, respectively, to the operations node 300 (e.g., the network management layer).

The notification 814 is indicative of the QoE measurement reporting being temporarily stopped. An example of sending 812 the notification 814 is illustrated at step 3b in FIG. 8A. The notification 830 is indicative of the QoE measurement reporting being restarted. An example of sending 828 the notification 830 from the RAN 200 to the operations node 300 (e.g., the network management layer) is illustrated at step 7a in FIG. 8A Optionally, the notification 814 and/or the notification 830 to the operations node 300 includes an indication of a service type such as streaming, MTSI or similar. Alternatively or in addition, the notification 814 and/or the notification 830 from the RAN 200 is indicative of a level of the load, the entering/exiting high load or something similar/equivalent instead of reporting temporarily stopped/re-started.

Note that the operations node 300 (e.g., any management system or the Network Manager, NM, 310) may after receiving the notification 814 in step 3b modify an original job 704, e.g., by increasing the area (e.g., the QoE target) and/or prolonging a duration of the QoE measurement collection. The reason for modifying the original job 704 may, e.g., be due to the fact that RAN overload has occurred for an extended period of time. The modification of the original job 704 may require that the NM 310 deactivates the current job 704 and sends a modified activateAreaQoEJob to the RAN 200.

In yet another embodiment, the AT command comprising or representing the stop control message 820 (e.g., in step 4 of FIG. 8A) and/or the AT command comprising or representing the restart control message 842 (e.g., in step 8 of FIG. 8A) are enhanced to indicate to the application layer 120 of the UE 100 that measurement reporting has been temporarily been stopped and/or restarted, respectively, and that the QoE measurements (including the storing of the results thereof) is to be continued.

The AT command "+CAPPLEVMC" (e.g., based on the 3GPP document TS 27.007, version 16.1.0, section 8.78) is enhanced, e.g., as indicated below in bold type for the values 1 and 2 of the parameter <start-stop_reporting>:

-------------------Extract from 3GPP TS 27.007 16.1.0 with enhancements-------------------

8.78 Application Level Measurement Configuration +CAPPLEVMC

TABLE 8.78-1

+CAPPLEVMC parameter command syntax

| Command | Possible response(s) |
|---|---|
| +CAPPLEVMC=[<n>] | +CME ERROR: <err> |
| +CAPPLEVMC? | +CAPPLEVMC: <n> |
| +CAPPLEVMC=? | +CAPPLEVMC: (list of supported <n>s) |

Description

This command allows control of the application level measurement configuration according to 3GPP TS 25.331 [74] and 3GPP TS 36.331 [86]. The set command controls the presentation of the unsolicited result code +CAPPLEVMC: <app-meas_service_type>, <start-stop_reporting>, [, <app-meas_config_file_length>, <app-meas_config-file>] providing data for the configuration. Refer subclause 9.2 for possible <err> values. Read command returns the current value of <n>.

Test command returns values supported as a compound value.

Defined Values

<n>: integer type. Disable and enable presentation of the unsolicited result code +CAPPLEVMC to the TE.

0 Disable presentation of the unsolicited result code

1 Enable presentation of the unsolicited result code

<app-meas_service_type>: integer type. Contains the indication of what application that is target for the application level measurement configuration.

1 QoE measurement collection for streaming services

2 QoE measurement collection for MTSI services

<start-stop_reporting>: integer type. Indicates the start and stop of the application level measurement reporting for the application indicated by the <app-meas_service_type>.

0 start the application level measurement reporting 1 stop the application level measurement reporting and discard any collected measurements, delete the measurement configuration 2 temporarily stop application level measurement reporting, continue application measurement collection and store the last x reports <app-meas_config_file_length>: integer type. Indicates the number of octets of the <app-meas_config-file> parameter.

<app-meas_config-file>: string of octets. Contains the application level measurement configuration file for the application indicated by the <app-meas_service_type>. The parameter shall not be subject to conventional character conversion as per +CSCS.

Implementation

Optional.

------------------End of Extract from 3GPP TS 27.007 16.1.0 with enhancements------------------

The above implementations, e.g., the above signaling enhancements, are non-limiting examples and other possible implementations of signaling the temporary stop of reporting and/or restart, e.g., in the context of the 3GPP technical specification 27.007, e.g., using a similar functionality.

For example, the signaling from the access stratum 110 to the application layer 120 may signal something similar and/or equivalent such as RAN node entering and/or RAN node exiting high load. A behavior at the application layer 120 may be specified or pre-specified to temporarily stop and/or restart the reporting, respectively. Alternatively or in addition, the a configuration in the <app-meas_config-file> may instruct the application layer 120 what to do in the event of entering and/or exiting high RAN load.

In a further embodiment, in order for the UE 100 to notify the Measurement Collection Entity (MCE) 330 that an overload condition has taken place during the QoE measurement collection, the measurement report 862 is enhanced with one or more indications that overload has occurred during the collection of the report. More than one indication may be needed under circumstances where overload persist over several QoE recordings in the UE 100. Additionally, the information (as to overload or level of overload) in the notifications 814 and/or 830 and/or in the report 862 may be included in the form of a timestamp of when QoE measurement reporting has been stopped 824C and restarted 846 and/or the reporting stoppage can be reported as an overall fraction of the total duration of the measurement.

Figure 8B:
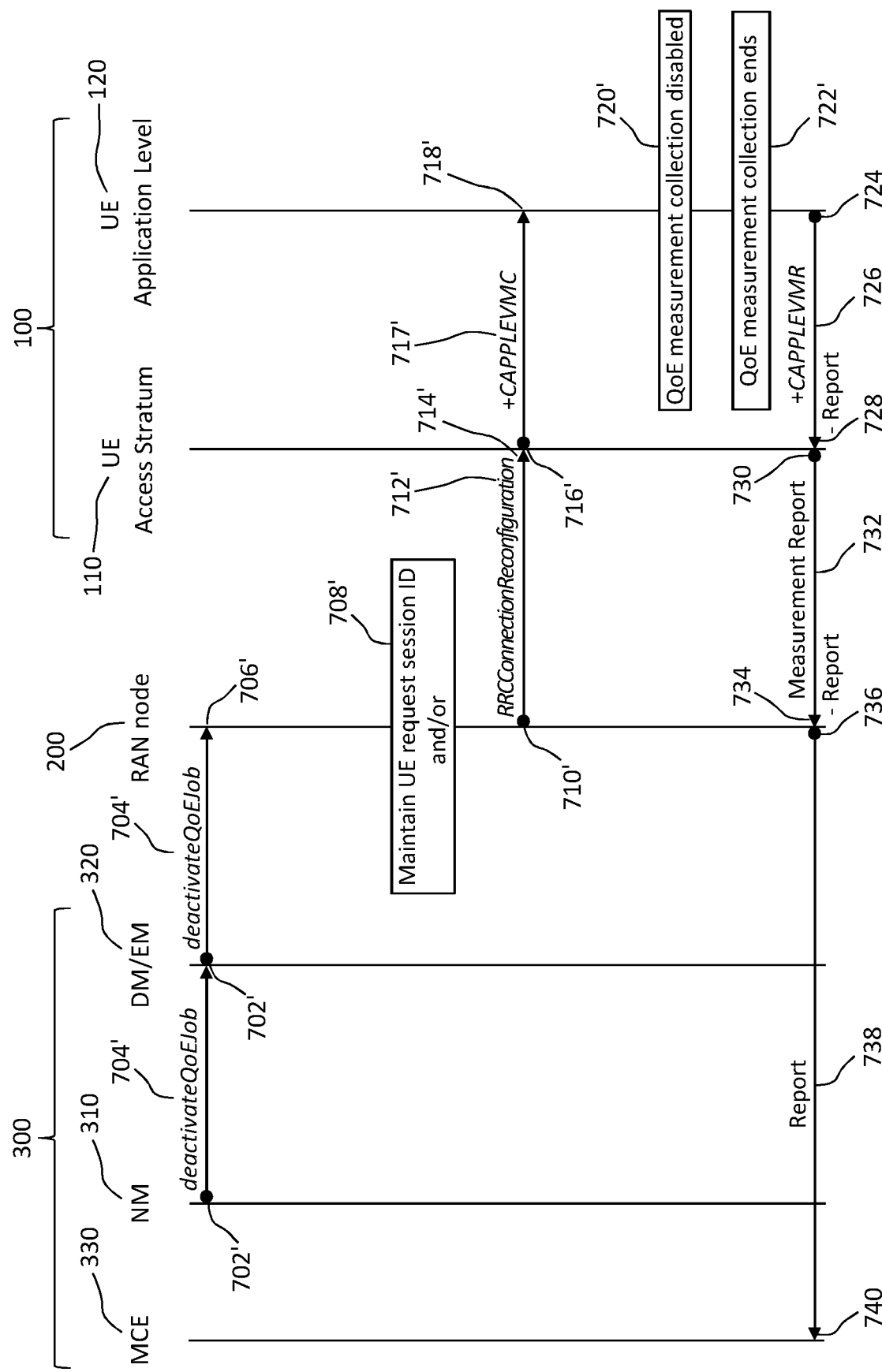
FIG. 8B shows a third example of a schematic signaling diagram resulting from embodiments of the radio device, the RAN node and the operation node in communication.

Optionally, the QoE measurements are deactivated by means of forced deactivation, e.g., triggered by the operations node 300. FIG. 8B schematically illustrates a signaling diagram for an implementation of the forced deactivation.

The operations node 300 may deactivate a measurement collection job before the pre-set time has expired by sending 702' a deactivateQoEJob 704' operation to the RAN node 200. The RAN node 200 sets 710' a network request session to ended, but does not delete the UE request session id and the Collection Entity Address parameters, e.g., as the UE 100 still may send 730 reports 732, which shall be send 736 to the MCE 330. For UE request sessions that have reported that a recording session is started, the RAN node 200 sends 710' an RRCConnectionReconfiguration message 712' to relevant UEs 100. The RRCConnectionReconfiguration message 712' is including measConfigAppLayer set to discard application layer measurement report information in otherConfig. The access stratum layer 110 sends 716' +CAPPLEVMC AT command 717' to the application layer 120 with the discard request. The application layer 120 stops 720' the recording session and stops 722' recording of the requested information. The UE request session id and the Collection Entity Address parameters in the RAN node 200 are deleted when the UE request session is ended.

Herein, like reference signs may refer to equal or interchangeable steps or features.

In a variant, e.g., of any of the embodiments and implementations, the Quality of Experience (QoE) measurements may be replaced (e.g., implemented) by application layer (AL) measurements.

Herein below, exemplary implementations of the embodiments are specified. Collecting QoE information may be an example of storing the results of the QoE measurements.

A first implementation comprises a streaming indication and/or relates to simultaneous QoE Measurement Collections (QMCs).

The first implementation may be based on the following rationale.

The indication for QoE information collection can also be used at RAN overload; and/or It shall be possible to simultaneously collect several QoE measurement from a UE.

Details of the first implementation are described below. The first implementation may be implemented by at least one of the following features.

The storing may comprise collecting QoE information from end user services.

REQ-EUSPC-CON-1: The operator shall have a capability to request collection of QoE information per end user service/end user service type for a specified area. The request may include an address of a collection center to which the collected information shall be delivered.

REQ-EUSPC-CON-2: The application providing the end user service performance information should have the capability to provide this information to a collection center.

REQ-EUSPC-CON-3: It should be possible to restrict the QoE information collection to a subset of the sessions in a UE using an end user service/end user service type.

REQ-EUSPC-CON-4: The management system shall have a capability to request collection of end user service performance information for one specified UE. The request may include an address of a collection center to which the collected information shall be delivered.

REQ-EUSPC-CON-5: The management system shall have a capability to request collection of end user service performance information for a specific service type provided by specific streaming sources. The request may include information of streaming sources for which the information shall be collected.

REQ-EUSPC-CON-6: The 3GPP network shall have a capability to forward an indication to the management system that a recording session has been started.

REQ-EUSPC-CON-7: The operator shall have a capability to stop the collection of QoE information job.

REQ-EUSPC-CON-x: The operator shall have a capability to order several QoE measurement collections from each UE simultaneously.

REQ-EUSPC-CON-y: The RAN shall have a capability to temporarily stop QoE measurement reporting at RAN overload.

REQ-EUSPC-CON-z: The RAN shall have a capability to restart temporary stopped QoE measurement reporting when RAN overload has ended.

The QoE information to be collected may be specified in ref. 3GPP TS 26.247, e.g., version 16.1.0 or 16.3.0; and 3GPP TS 26.114, e.g. version 16.2.0 or 16.6.0.

The reporting may comprise an indication of QoE information collection, e.g., according to any entry in below table.

| Use case stage | Evolution/Specification | <<Uses>> Related use |
|---|---|---|
| Goal | Provide the OAM system with an indication that a recording session has started and subsequently allow the OAM system to modify the QoE measurement configuration e.g. the QoE configured area if the number of sessions are too small or too large. The indication may also be used to determine whether or not to terminate the QoE information collection if sufficient number of recording sessions have been started. | |
| Actors and roles | The operator which is the requester of the QoE information. | |
| Telecom resources | The management system and the RAN node. | |
| Assumptions | | |
| Pre-conditions | Selected end users have been requested to provide QoE Information when the specified end user service type is used. | |
| Begins when | The application layer sends AT command including streaming indication to access stratum | |
| Step 1 (M) | When the RAN node receives the streaming indication from the UE access stratum, the RAN node sends an indication to the triggering OAM system that a recording session has been started. | |
| Ends when | The management system has received the indication that a recording session has been started. | |
| Exceptions | | |
| Post-conditions | The OAM system is able to decide if the ongoing QoE measurement collection needs modification and if sufficient data has been obtained for analysis. The OAM system can use the indications to trigger evaluation of collected data. | |
| Traceability | REQ-EUSPC-CON-6 | |

The QoE information reporting may be temporarily stopped and restarted during RAN overload, e.g., according to any entry in below table.

| Use case stage | Evolution/Specification | <<Uses>> Related use |
|---|---|---|
| Goal | At RAN overload RAN may stop or delay the QoE information reporting from the UEs that has started it. | |
| Actors and roles | The RAN node which is the requester of delaying the QoE information reporting. | |
| Telecom resources | The RAN node and the UE. | |
| Assumptions | — | |
| Pre-conditions | Selected UEs have started QoE information collection. | |
| Begins when | The RAN node detects that it is overloaded. | |
| Step 1 (M) | The RAN node sends a request to temporarily stop the reporting to the UEs that has started the QoE information collection. An indication about the temporary stop is sent to the management system. | |
| Step 2 (M) | When the UE receives the request from the RAN node to temporarily stop reporting, the UE access stratum informs | |

| Use case stage | Evolution/Specification | <<Uses>> Related use |
|---|---|---|
| | the application that reporting has temporarily been stopped. The application continues any ongoing recording and stores the recorded information until a restart request is received. | |
| Step 3 (M) | When the RAN overload situation is ended, the RAN node sends a request to restart the reporting to the UEs that has temporarily stopped the QoE information reporting. An indication about the restart is sent to the management system. | |
| Step 4 (M) | When the UE receives the request from the RAN node, the UE access stratum informs the application to restart the QoE information reporting. | |
| Ends when | The management system has received the indication that a recording session has been restarted. | |
| Exceptions | The recording time expires before the RAN overload is ended. | |
| Post-conditions | The QoE information collection is active. | |
| Traceability | REQ-EUSPC-CON-y, REQ-EUSPC-CON-z | |

A second implementation comprises a forced deactivation and/or a RAN overload.

The second implementation may be based on the following rationale.

The description of how the forced activation is done in the UE is aligned with may refer to the 3GPP document TS 36.331 ("Radio Resource Control (RRC) protocol specification"), e.g., version 15.6.0 or 16.1.1; and/or forced deactivation can also be used at overload in RAN.

Details of the second implementation are described below. The second implementation may be implemented by at least one of the following features.

A forced deactivation may be implemented as follows.

If the operator technician or the management application wants to deactivate a measurement collection job before the pre-set time has expired, the management is system sends the deactivateQoEJob operation (e.g., according to the document 3GPP TS 26.114, e.g. version 16.2.0 or 16.6.0) to the eNB. The eNB sets the network request session to ended, but does not delete the UE request session id and the Collection Entity Address parameters (e.g., according to the document 3GPP TS 26.114, e.g. version 16.2.0 or 16.6.0), as the UE still may send reports which shall be send to the collection center. For UE request sessions which have reported that a recording session is started, the eNB sends the RRCConnectionReconfiguration message to relevant UEs. The RRCConnectionReconfiguration message is including measConfigAppLayer set to discard application layer measurement report information in otherConfig. The Access stratum sends +CAPPLEVMC AT command to the application with the discard request. The application stops the recording session and stops recording of the requested information. The UE request session id and the Collection Entity Address parameters (e.g., according to the document 3GPP TS 26.114, e.g. version 16.2.0 or 16.6.0) in the eNB are deleted when the UE request session is ended.

The temporary stop and restart of QoE information reporting during RAN overload may be implemented in LTE as follows.

In case of overload in RAN, the RAN node 200 (e.g., an eNB or gNB) may temporarily stop the reporting from the UE 100 by sending the RRCConnectionReconfiguration message (e.g., the message 808) to relevant UEs 100. The RRCConnectionReconfiguration message 808 is including measConfigAppLayer set to temporarily stop application layer measurement reporting in otherConfig. The Access stratum 110 sends +CAPPLEVMC AT command (e.g., the command 820) to the application layer 120 (e.g., to the relevant application) with the temporary stop request. The application stops the reporting and stops recording further information when the data in the reporting container is used. Then the recorded data is kept until it is reported or when the UE request session is ended.

When the overload situation in RAN is ended, the RAN node 200 (e.g., an eNB or gNB) restart the reporting from the UE 100 by sending the RRCConnectionReconfiguration message (e.g., the message 836) to relevant UEs 100. The RRCConnectionReconfiguration message 836 is including measConfigAppLayer set to restart application layer measurement reporting in otherConfig. The Access stratum layer 110 sends +CAPPLEVMC AT command (e.g., the command 842) to the application layer 120 (e.g., the relevant application) with the restart request. The application restarts the reporting and recording if it was stopped.

Figure 9:
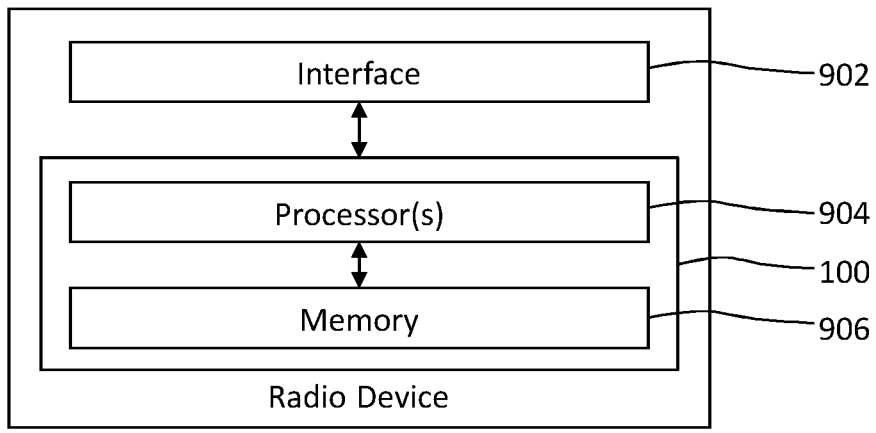
FIG. 9 shows a schematic block diagram of an embodiment of the radio device of FIG. 1.

FIG. 9 shows a schematic block diagram for an embodiment of the radio device 100. The radio device 100 comprises one or more processors 904 and memory 906 coupled to the processors 904, e.g., for performing the method 400.

The one or more processors 904 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the radio device 100, such as the memory 906, radio device functionality. For example, the one or more processors 904 may execute instructions stored in the memory 906. Such functionality may include providing various features and steps discussed herein, including any of the benefits disclosed herein. The expression "the device being operative to perform an action" may denote the radio device 100 being configured to perform the action.

As schematically illustrated in FIG. 9, the radio device 100 may be embodied by a device 900 comprises a radio interface 902 for radio access to the RAN node 200.

Figure 10:
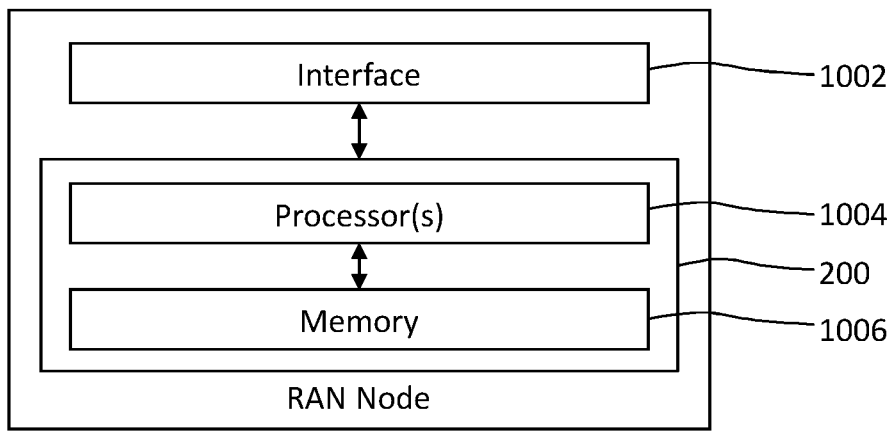
FIG. 10 shows a schematic block diagram of an embodiment of the RAN node of FIG. 2.

FIG. 10 shows a schematic block diagram for an embodiment of the RAN node 200. The RAN node 200 comprises one or more processors 1004 and memory 1006 coupled to the processors 1004, e.g., for performing the method 500.

The one or more processors 1004 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the RAN node 200, such as the memory 1006, operations node functionality. For example, the one or more processors 1004 may execute instructions stored in the memory 1006. Such functionality may include providing various features and steps discussed herein, including any of the benefits disclosed herein. The expression "the device being operative to perform an action" may denote the RAN node 200 being configured to perform the action.

As schematically illustrated in FIG. 10, the RAN node 200 may be embodied by a node 1000 comprises a radio interface 1002 and/or an operations interface 1002 for providing radio access to the radio device 100 and/or coupled to the operations node 300, respectively.

Figure 11:
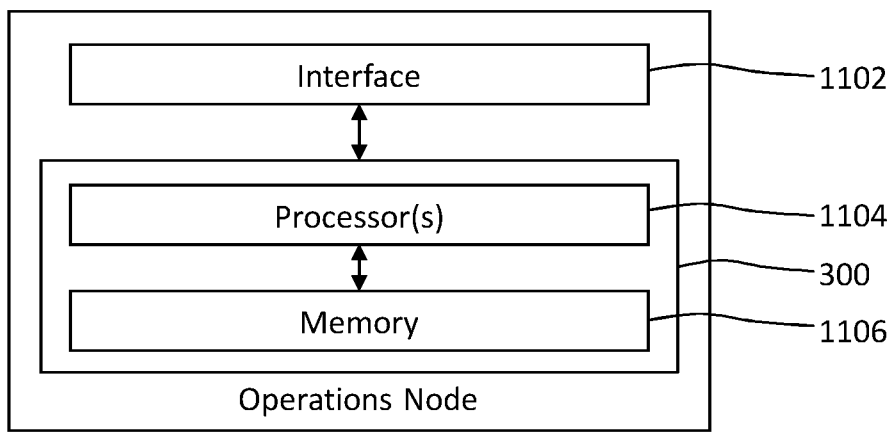
FIG. 11 shows a schematic block diagram of an embodiment of the operation node of FIG. 3.

FIG. 11 shows a schematic block diagram for an embodiment of the operations node 300. The operations node 300 comprises one or more processors 1104 and memory 1106 coupled to the processors 1104, e.g., for performing the method 600.

The one or more processors 1104 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the operations node 300, such as the memory 1106, operations node functionality. For example, the one or more processors 1104 may execute instructions stored in the memory 1106. Such functionality may include providing various features and steps discussed herein, including any of the benefits disclosed herein. The expression "the device being operative to perform an action" may denote the operations node 300 being configured to perform the action.

As schematically illustrated in FIG. 11, the operations node 300 may be embodied by a node 1100 comprises an interface 1102 coupled to the RAN 200 for monitoring overload and/or QoE in the RAN 200.

Figure 12:
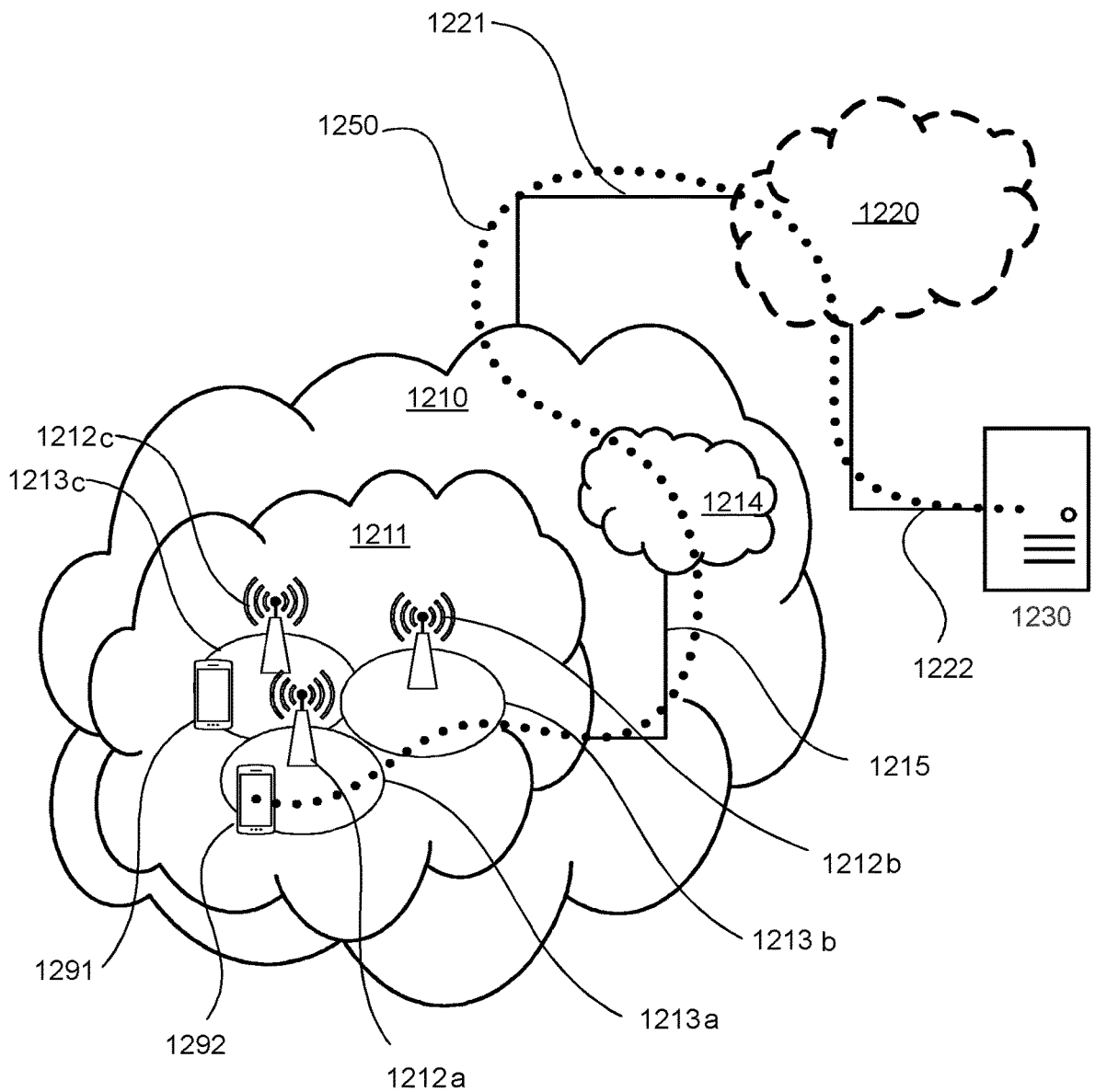
FIG. 12 schematically illustrates a telecommunication network connected via an intermediate network to a host computer.

With reference to FIG. 12, in accordance with an embodiment, a communication system 1200 includes a telecommunication network 1210, such as a 3GPP-type cellular network, which comprises an access network 1211, such as a radio access network, and a core network 1214. The access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to the core network 1214 over a wired or wireless connection 1215. A first user equipment (UE) 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

The telecommunication network 1210 is itself connected to a host computer 1230, which may be embodied in the hardware and/or software of a standalone server, a cloud-implemented server, a distributed server or as processing resources in a server farm. The host computer 1230 may be under the ownership or control of a service provider, or may be operated by the service provider or on behalf of the service provider. The connections 1221, 1222 between the telecommunication network 1210 and the host computer 1230 may extend directly from the core network 1214 to the host computer 1230 or may go via an optional intermediate network 1220. The intermediate network 1220 may be one of, or a combination of more than one of, a public, private or hosted network; the intermediate network 1220, if any, may be a backbone network or the Internet; in particular, the intermediate network 1220 may comprise two or more sub-networks (not shown).

The communication system 1200 of FIG. 12 as a whole enables connectivity between one of the connected UEs 1291, 1292 and the host computer 1230. The connectivity may be described as an over-the-top (OTT) connection 1250. The host computer 1230 and the connected UEs 1291, 1292 are configured to communicate data and/or signaling via the OTT connection 1250, using the access network 1211, the core network 1214, any intermediate network 1220 and possible further infrastructure (not shown) as intermediaries. The OTT connection 1250 may be transparent in the sense that the participating communication devices through which the OTT connection 1250 passes are unaware of routing of uplink and downlink communications. For example, a base station 1212 may not or need not be informed about the past routing of an incoming downlink communication with data originating from a host computer 1230 to be forwarded (e.g., handed over) to a connected UE 1291. Similarly, the base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 13. In a communication system 1300, a host computer 1310 comprises hardware 1315 including a communication interface 1316 configured to set up and maintain a wired or wireless connection with an interface of a different communication device of the communication system 1300. The host computer 1310 further comprises processing circuitry 1318, which may have storage and/or processing capabilities. In particular, the processing circuitry 1318 may comprise one or more programmable processors, application-specific integrated circuits, field programmable gate arrays or combinations of these (not shown) adapted to execute instructions. The host computer 1310 further comprises software 1311, which is stored in or accessible by the host computer 1310 and executable by the processing circuitry 1318. The software 1311 includes a host application 1312. The host application 1312 may be operable to provide a service to a remote user, such as a UE 1330 connecting via an OTT connection 1350 terminating at the UE 1330 and the host computer 1310. In providing the service to the remote user, the host application 1312 may provide user data which is transmitted using the OTT connection 1350.

The communication system 1300 further includes a base station 1320 provided in a telecommunication system and comprising hardware 1325 enabling it to communicate with the host computer 1310 and with the UE 1330. The hardware 1325 may include a communication interface 1326 for setting up and maintaining a wired or wireless connection with an interface of a different communication device of the communication system 1300, as well as a radio interface 1327 for setting up and maintaining at least a wireless connection 1370 with a UE 1330 located in a coverage area (not shown in FIG. 13) served by the base station 1320. The communication interface 1326 may be configured to facilitate a connection 1360 to the host computer 1310. The connection 1360 may be direct or it may pass through a core network (not shown in FIG. 13) of the telecommunication system and/or through one or more intermediate networks outside the telecommunication system. In the embodiment shown, the hardware 1325 of the base station 1320 further includes processing circuitry 1328, which may comprise one or more programmable processors, application-specific integrated circuits, field programmable gate arrays or combinations of these (not shown) adapted to execute instructions. The base station 1320 further has software 1321 stored internally or accessible via an external connection.

The communication system 1300 further includes the UE 1330 already referred to. Its hardware 1335 may include a radio interface 1337 configured to set up and maintain a wireless connection 1370 with a base station serving a coverage area in which the UE 1330 is currently located. The hardware 1335 of the UE 1330 further includes processing circuitry 1338, which may comprise one or more programmable processors, application-specific integrated circuits, field programmable gate arrays or combinations of these (not shown) adapted to execute instructions. The UE 1330 further comprises software 1331, which is stored in or accessible by the UE 1330 and executable by the processing circuitry 1338. The software 1331 includes a client application 1332. The client application 1332 may be operable to provide a service to a human or non-human user via the UE 1330, with the support of the host computer 1310. In the host computer 1310, an executing host application 1312 may communicate with the executing client application 1332 via the OTT connection 1350 terminating at the UE 1330 and the host computer 1310. In providing the service to the user, the client application 1332 may receive request data from the host application 1312 and provide user data in response to the request data. The OTT connection 1350 may transfer both the request data and the user data. The client application 1332 may interact with the user to generate the user data that it provides.

Figure 13:
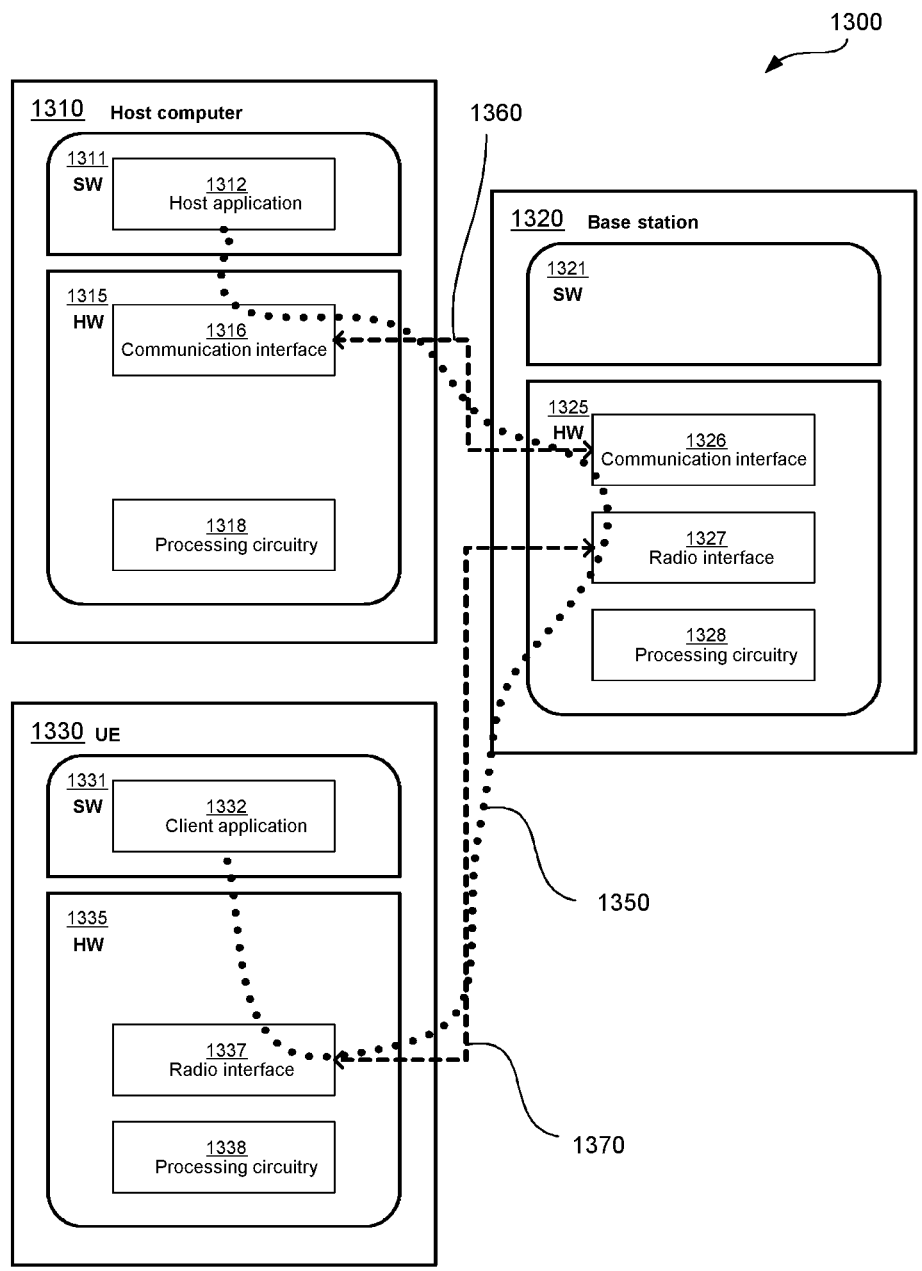
FIG. 13 shows a generalized block diagram of a host computer communicating via a base station with a user equipment over a partially wireless connection.

It is noted that the host computer 1310, base station 1320 and UE 1330 illustrated in FIG. 13 may be identical to the host computer 1230, one of the base stations 1212*a*, 1212*b*, 1212*c* and one of the UEs 1291, 1292 of FIG. 12, respectively. This is to say, the inner workings of these entities may be as shown in FIG. 13 and independently, the surrounding network topology may be that of FIG. 12.

In FIG. 13, the OTT connection 1350 has been drawn abstractly to illustrate the communication between the host computer 1310 and the use equipment 1330 via the base station 1320, without explicit reference to any intermediary devices and the precise routing of messages via these devices. Network infrastructure may determine the routing, which it may be configured to hide from the UE 1330 or from the service provider operating the host computer 1310, or both. While the OTT connection 1350 is active, the network infrastructure may further take decisions by which it dynamically changes the routing (e.g., on the basis of load balancing consideration or reconfiguration of the network).

The wireless connection 1370 between the UE 1330 and the base station 1320 is in accordance with the teachings of the embodiments described throughout this disclosure. One or more of the various embodiments improve the performance of OTT services provided to the UE 1330 using the OTT connection 1350, in which the wireless connection 1370 forms the last segment. More precisely, the teachings of these embodiments may reduce the latency and improve the data rate and thereby provide benefits such as better responsiveness.

A measurement procedure may be provided for the purpose of monitoring data rate, latency and other factors on which the one or more embodiments improve. There may further be an optional network functionality for reconfiguring the OTT connection 1350 between the host computer 1310 and UE 1330, in response to variations in the measurement results. The measurement procedure and/or the network functionality for reconfiguring the OTT connection 1350 may be implemented in the software 1311 of the host computer 1310 or in the software 1331 of the UE 1330, or both. In embodiments, sensors (not shown) may be deployed in or in association with communication devices through which the OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of the OTT connection 1350 may include message format, retransmission settings, preferred routing etc.; the reconfiguring need not affect the base station 1320, and it may be unknown or imperceptible to the base station 1320. Such procedures and functionalities may be known and practiced in the art. In certain embodiments, measurements may involve proprietary UE signaling facilitating the host computer's 1310 measurements of throughput, propagation times, latency and the like. The measurements may be implemented in that the software 1311, 1331 causes messages to be transmitted, in particular empty or "dummy" messages, using the OTT connection 1350 while it monitors propagation times, errors etc.

Figures 14, 15:
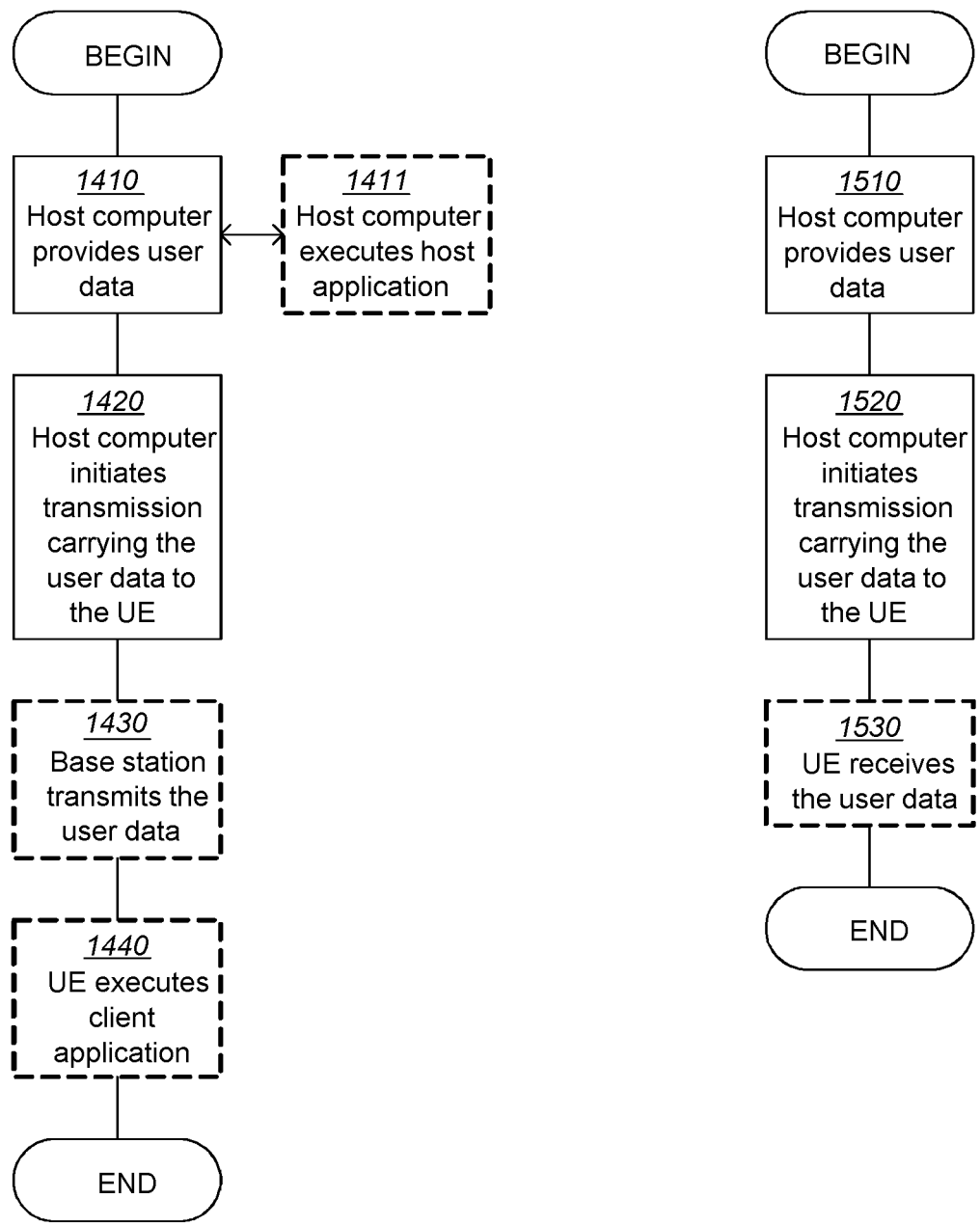
FIGS. 14 and 15 show flowcharts for methods implemented in a communication system including a host computer, a base station and a user equipment.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In a first step 1410 of the method, the host computer provides user data. In an optional substep 1411 of the first step 1410, the host computer provides the user data by executing a host application. In a second step 1420, the host computer initiates a transmission carrying the user data to the UE. In an optional third step 1430, the base station transmits to the UE the user data which was carried in the transmission that the host computer initiated, in accordance with the teachings of the embodiments described throughout this disclosure. In an optional fourth step 1440, the UE executes a client application associated with the host application executed by the host computer.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In a first step 1510 of the method, the host computer provides user data. In an optional substep (not shown) the host computer provides the user data by executing a host application. In a second step 1520, the host computer initiates a transmission carrying the user data to the UE. The transmission may pass via the base station, in accordance with the teachings of the embodiments described throughout this disclosure. In an optional third step 1530, the UE receives the user data carried in the transmission.

Any embodiment may comprise transmitting and/or receiving signaling (e.g., the notifications, the messages and/or the commands) to allow the QoE measurement reports to be collected during an overload of the RAN and/or signaling an indication (e.g., the notifications, the messages and/or the commands) of the load (e.g., of the overload), optionally together (e.g., within) a QoE measurement report.

As has become apparent from above description, embodiments of the technique enable QoE measurement reports that are available from conditions when a value of reports may be especially relevant, i.e. at high RAN load conditions.

Same or further embodiments can utilize more refined analysis of the QoE measurement reports, e.g., with the help of indication of load and/or overload in the RAN and/or the applicability of the measurement in terms of the amount of time that the measurement is taken within the desired measurement area.

More precise troubleshooting as QoE measurements at overload conditions may be included in the overall set of measurements. In any embodiment or implementation, there is optionally no need to resend the complete measurement configuration file to the UE, once the load in the RAN node returns to normal conditions.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention may be embodied, implemented and/or realized within the scope of the following claims.

The invention claimed is:

1. A method of reporting Quality of Experience (QoE) measurements or Application Layer (AL) measurements from a radio device wirelessly connected or connectable to a radio access network (RAN), the method comprising:
   receiving a stop control message from or through the RAN at the radio device, the stop control message being indicative of a command that configures the radio device to:
      stop reporting results of the QoE or AL measurements to or through the RAN;
      collect further results of the QoE or AL measurements while the reporting is stopped; and
      store the further results of the QoE or AL measurements at the radio device.

2. The method of claim 1, further comprising:
   collecting the further results of the QoE or AL measurements while the reporting is stopped;
   storing the further results of the QoE or AL measurements at the radio device; and/or
   stopping the reporting of the results of the QoE or AL measurements to or through the RAN.

3. The method of claim 1, wherein the stop control message relates to temporarily stopping the reporting and/or wherein the stop control message is indicative of a time period for restarting the reporting.

4. The method of claim 1, wherein the radio device maintains a configuration for performing the QoE or AL measurements after receiving the stop control message.

5. The method of claim 1, further comprising receiving a restart control message from or through the RAN at the radio device, the restart control message being indicative of a command for reporting the further results of the QoE or AL measurements stored at the radio device to or through the RAN.

6. The method of claim 5, wherein the stop control message and/or the restart control message is further indicative of an application or a service type for which the QoE or AL measurements are performed.

7. The method of claim 5, wherein the stop control message and/or the restart control message is further indicative of a level of an overload, congestion, and/or interference at the RAN.

8. The method claim 1, wherein the method comprises sending a stop control command from an access stratum layer of the radio device to an application layer of the radio device, the stop control command being indicative of the command that configures the radio device.

9. A method of controlling a reporting of Quality of Experience (QoE) measurements or Application Layer (AL) measurements from at least one radio device wirelessly connected or connectable to a radio access network (RAN), the method comprising:
   transmitting a stop control message from or through the RAN to the radio device, the stop control message being indicative of a command that configures the radio device to:
      stop reporting results of the QoE or AL measurements to or through the RAN;
      collect further results of the QoE or AL measurements while the reporting is stopped; and
      store the further results of the QoE or AL measurements at the radio device.

10. The method of claim 9, wherein the stop control message is indicative of a command for immediately stopping the radio device from reporting the stored results of the QoE or AL measurements to or through the RAN.

11. The method of claim 9:
   further comprising determining an overload in the RAN;
   wherein the stop control message is transmitted responsive to the determination of the overload in the RAN.

12. The method of claim 11, further comprising, sending, responsive to the determination of the overload in the RAN, a notification to an operations node associated with the RAN; the notification being indicative of the QoE or AL measurements reporting being temporarily stopped.

13. The method of claim 9, further comprising transmitting a restart control message from the RAN to the radio device, the restart control message being indicative of a command for starting or restarting a reporting of the stored further results of the QoE or AL measurements from the radio device to or through the RAN.

14. The method of claim 13, further comprising sending a notification from the RAN to an operations node, the notification being indicative of starting or restarting the QoE or AL measurements and/or being indicative of storing the results of the QoE or AL measurements.

15. The method of claim 14, wherein the sending of the notification is triggered by receiving a streaming indication from the radio device.

16. A radio device wirelessly connected or connectable to a radio access network (RAN), the radio device comprising:
   processing circuitry; and
   memory containing instructions executable by the processing circuitry whereby the radio device is operative to:

receive a stop control message from or through the RAN at the radio device, the stop control message being indicative of a command that configures the radio device to:
- stop reporting results of Quality of Experience (QoE) or Application Layer (AL) measurements to or through the RAN;
- collect further results of the QoE or AL measurements while the reporting is stopped; and
- store the further results of the QoE or AL measurements at the radio device.

17. A radio access node (RAN), comprising:

processing circuitry; and memory containing instructions executable by the processing circuitry whereby the RAN is operative to:
transmit a stop control message from or through the RAN to a radio device wirelessly connected or connectable to the RAN, the stop control message being indicative of a command that configures the radio device to:
- stop reporting results of Quality of Experience (QoE) or Application Layer (AL) measurements to or through the RAN;
- collect further results of the QoE or AL measurements while the reporting is stopped; and
- store the further results of the QoE or AL measurements at the radio device.

* * * * *